(12) United States Patent
Inoguchi et al.

(10) Patent No.: US 6,493,146 B2
(45) Date of Patent: Dec. 10, 2002

(54) IMAGE DISPLAY APPARATUS

(75) Inventors: Kazutaka Inoguchi, Kawasaki (JP); Akinari Takagi, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/761,578

(22) Filed: Jan. 18, 2001

(65) Prior Publication Data

US 2002/0036831 A1 Mar. 28, 2002

(30) Foreign Application Priority Data

Aug. 9, 2000 (JP) ........................................ 2000-241779

(51) Int. Cl.[7] .............................................. G02B 27/14
(52) U.S. Cl. ........................................ 359/630; 359/633
(58) Field of Search ................................ 359/627, 628, 359/629, 630, 631, 632, 633, 634, 636, 638, 640, 815, 462, 466; 345/7, 8, 9

(56) References Cited

U.S. PATENT DOCUMENTS

| | | | | |
|---|---|---|---|---|
| 6,204,975 B1 | * | 3/2001 | Watters et al. | 359/633 |
| 6,222,676 B1 | * | 4/2001 | Togino et al. | 359/630 |
| 6,331,916 B1 | * | 12/2001 | Mukawa | 359/630 |
| 6,396,639 B1 | * | 5/2002 | Togino et al. | 359/630 |
| 6,404,557 B2 | * | 6/2002 | Curley et al. | 359/630 |

* cited by examiner

*Primary Examiner*—Georgia Epps
*Assistant Examiner*—Saeed Seyrafi
(74) *Attorney, Agent, or Firm*—Fitzpatrick, Cella, Harper & Scinto

(57) ABSTRACT

An image display apparatus has a reflective display device, an illumination optical system with a reflective surface A for guiding light from a light source to the display device, and a display optical system for guiding light from the display device to an observer's observation position and is constructed to permit an observer to observe image information displayed on the display device. The image display apparatus is constructed in appropriate setting of principal rays emerging from a display surface of the display device and impinging upon the center of the exit pupil, illumination principal rays emerging from the light source and guided to the display surface by the illumination optical system to become principal rays, angles of incidence and emergence of the illumination principal rays and the principal rays to and from the display surface, an angle between the reflective surface A and the display surface, angles of incidence of the illumination principal rays to the reflective surface A, and so on.

27 Claims, 12 Drawing Sheets

IMAGE DISPLAY APPARATUS

BACKGROUND OF THE INVENTION

1. Field of the Invention

The present invention relates to image display apparatus and, more particularly, to image display apparatus suitably applicable to head-mounted displays or the like adapted to enable observation of an enlarged view of image information displayed on a reflective liquid-crystal display element as a display element through an optical element having properly set free-form surfaces.

2. Related Background Art

There are conventionally well-known image display apparatus of a head-mounted type (head-mounted displays) using the display element of a CRT, an LCD, or the like and constructed to enlarge an image displayed on such a display element through an optical system to permit observation of an enlarged view of the displayed image.

FIG. 10 is a schematic diagram of main part of a conventional image display device using a coaxial concave reflector. In the same figure light from the image displayed on the display element 61 is reflected by a half mirror 62 to be incident to the concave mirror 63. The light reflected by the concave mirror 63 is guided through the half mirror 62 to an observer E. The image displayed on the display element 61 is focused as an enlarged virtual image by the concave mirror 63. This permits the observer to observe the enlarged virtual image of the image displayed on the display element 61.

For example, Japanese Patent Applications Laid-Open No. 07-333551, No. 08-50256, No. 08-160340, No. 08-179238, etc. describe proposals of the image display devices reduced in the thickness of the entire apparatus by using an LCD (liquid-crystal display) as a display means for displaying an image and a slim prism as an observation optical system.

FIG. 11 is a schematic diagram of main part of the image display device proposed in Japanese Patent Application Laid-Open No. 07-333551. In FIG. 11, the light emitted from the LCD 51 is made incident to an entrance surface 53 of the compact prism 52. Then the light is folded between a total reflection surface 54 with curvature and a reflective surface 55 in the compact prism 52 and thereafter is guided out of the compact prism 52 through the surface 54 toward the observer E. This results in forming a virtual image of the image displayed on the display means (LCD) 51 so as to permit the observer E to observe the virtual image. The reflective surface 55 of the compact prism 52 is a decentered free-form surface comprised of a decentered rotationally asymmetric surface (a surface with optical powers differing depending upon azimuths, which is so called a free-form surface).

The type of the optical system illustrated in FIG. 11 has such a feature that it is easier to decrease the thickness of the entire apparatus and increase the angle of view of the observation field than in the case of the type using the conventional coaxial concave mirror illustrated in FIG. 10.

With the conventional image display devices such as the head-mounted displays, goggle-type displays, etc., there are particular demands for further decrease in the size and weight of the entire apparatus, because these devices are mounted on the head. Particularly, they are preferably constructed to be thin in the direction of the visual axis of the observer in view of the weight balance, the appearance, and so on. Another important subject is to widen the angle of observation view in order to give strong appeal to the observation of the image displayed on the display means.

In the image display device such as the thin head-mounted display (HMD) of the type illustrated in FIG. 11, if the display element is constructed of a reflective display element with a high aperture ratio advantageous in compactification, an illumination system 70 for illuminating the display element 74 will be needed, for example, between the reflective display element 74 and the entrance surface 53 of the compact prism 52, as illustrated in FIG. 12.

The illumination system 70 herein is composed, for example, of a light source 71, a condenser lens 72 for condensing diverging light from the light source 71, a prism 73 including a half mirror surface 73a which reflects the light from the condenser lens 72 to illuminate the display element 74 and which makes the angle of 45° with the display surface of the display element 74, and so on. In the image display apparatus, the use of the reflective display element raises the necessity for the placement of the illumination system for illuminating it between the display element 74 and the compact prism 52 and, in turn, the need for increasing the space between the prism 52 and the display element 74, as illustrated in FIG. 12, thus posing the problem of decrease in the angle of view or the like with failing to take advantage of the feature of this type.

SUMMARY OF THE INVENTION

An object of the present invention is to provide image display apparatus that can accomplish both compactness of apparatus and a wide angle of view by properly setting construction of the illumination optical system for illuminating the display means, a display optical system for guiding the light from the display means to the observer's eyes, for example, an optical means consisting of a prism body with refracting action, etc. for observation of the image information displayed on the reflective display means of the liquid-crystal display or the like in the image display apparatus of HMD or the like and that can realize observation of the image with excellent image quality without bringing about degradation of contrast, unevenness of contrast in the screen, etc. in the observation field.

An image display apparatus according to one aspect of the present invention is an image display apparatus for permitting an observer to observe image information displayed on display means, comprising: reflective display means; an illumination optical system having a reflective surface A for guiding light from light source means to the display means; and a display optical system for guiding light from the display means to an observation position of the observer, wherein when principal rays are defined as rays emerging from a display surface of the display means and impinging upon the center of an exit pupil and when a center-view-angle principal ray is defined as a ray emerging from the center of the display surface of the display means and passing the center of the exit pupil of the display optical system, the display optical system comprises a decentered reflective surface or a plurality of decentered optical systems decentered relative to the center-view-angle principal ray and having a power, wherein when illumination principal rays are defined as rays emerging from the light source means and guided onto the display surface by the illumination optical system to become the principal rays, an angle of incidence of each illumination principal ray onto the display surface and an angle of emergence of a corresponding principal ray from the display surface make a predetermined angle, and wherein when a center illumination principal ray is defined as a ray emerging from the light source means and guided to the center of the display surface by the illumination optical system to become the center-view-angle principal ray, when a coordinate system is so defined that a yz plane is set on a surface formed by incidence and emergence of the center illumination principal ray to and from the reflective surface A and that a z-axis is taken along a direction of a normal to the reflective surface A in the yz plane, a y-axis along a tangent direction thereto, and an x-axis along a direction normal to the yz plane, and when the illumination principal rays are projected onto the xz plane of the coordinate system, the illumination principal rays projected onto the xz plane are incident at respective angles of incidence approximately equal to each other to the reflective surface A.

In a further aspect of the present invention, said reflective surface A acts to totally reflect the light when the light from said light source means is guided to said display means and said reflective surface A acts to transmit the light when the light from the display means is guided to the observation position.

In a further aspect of the present invention, the apparatus is constructed so that in said coordinate system, when said illumination principal rays are projected onto the yz plane, the illumination principal rays projected onto the yz plane are incident at respective angles of incidence approximately equal to each other to said reflective surface A.

In a further aspect of the present invention, an optical member having said reflective surface A comprises at least one curved surface.

In a further aspect of the present invention, said reflective surface A is a surface having no power at least in the direction of the x-axis.

In a further aspect of the present invention, said illumination optical system comprises a first polarizer for converting the light from said light source means into linearly polarized light.

In a further aspect of the present invention, said display optical system comprises a second polarizer whose transmission axis is approximately perpendicular to that of said first polarizer.

In a further aspect of the present invention, said illumination optical system comprises an optical element having a positive power and light transmitted by the optical element is made incident to said first polarizer.

In a further aspect of the present invention, said optical element having the positive power comprises a reflective surface.

An image display apparatus according to another aspect of the present invention is an image display apparatus for permitting an observer to observe image information displayed on display means, comprising: reflective display means; an illumination optical system having a reflective surface A for guiding light from light source means to the display means; and a display optical system for guiding light from the display means to an observation position of the observer, wherein when principal rays are defined as rays emerging from a display surface of the display means and impinging upon the center of an exit pupil and when a center-view-angle principal ray is defined as a ray emerging from the center of the display surface of the display means and passing the center of the exit pupil of the display optical system, the display optical system comprises a decentered reflective surface or a plurality of decentered optical systems decentered relative to the center-view-angle principal ray and having a power, wherein when illumination principal rays are defined as rays emerging from the light source means and guided onto the display surface by the illumination optical system to become the principal rays and when β represents an angle between the reflective surface A and the display surface of the display means, the angle β satisfies the relation of β<45°, and wherein when a center illumination principal ray is defined as a ray emerging from the light source means and guided to the center of the display surface by the illumination optical system to become the center-view-angle principal ray, when a coordinate system is so defined that a yz plane is set on a surface formed by incidence and emergence of the center illumination principal ray to and from the reflective surface A and that a z-axis is taken along a direction of a normal to the reflective surface A in the yz plane, a y-axis along a tangent direction thereto, and an x-axis along a direction normal to the yz plane, and when the illumination principal rays are projected onto the xz plane of the coordinate system, the illumination principal rays projected onto the xz plane are incident at respective angles of incidence approximately equal to each other to the reflective surface A.

In the above-stated image display apparatus according to a further aspect of the present invention, at least one surface out of said plurality of decentered reflective surfaces is a rotationally asymmetric surface.

In the above-stated image display apparatus according to a further aspect of the present invention, said display optical system comprises an optical element integrally formed of said plurality of decentered reflective surfaces, an entrance surface, and an exit surface.

In the above-stated image display apparatus according to a further aspect of the present invention, said illumination optical system comprises a plurality of reflective surfaces and said reflective surface A is a final reflective surface in an optical path for guiding the light from the light source means to said display means.

In the above-stated image display apparatus according to a further aspect of the present invention, when said illumination principal rays are projected onto the xz plane of said coordinate system and when θx represents an angle between a normal at a hit point of each illumination principal ray on the reflective surface A and a line of a projection of said each illumination principal ray onto the xz plane of said coordinate system, each illumination principal ray is incident to said reflective surface A so as to satisfy the following condition:

$$|\theta x| \leq 5°.$$

In the above-stated image display apparatus according to a further aspect of the present invention, when the illumination principal rays are projected onto the yz plane of said coordinate system, when θy represents an angle between a normal at a hit point of each illumination principal ray on the reflective surface A and a line of a projection of said each illumination principal ray onto the yz plane of said coordinate system, and when n represents a refractive index of a medium before and after reflection on the reflective surface A, each illumination principal ray is incident to said reflective surface A so as to satisfy the following condition:

$$\arcsin(1/n) \leq \theta y \leq 1.5 * \arcsin(1/n).$$

An image display apparatus according to another aspect of the present invention is an image display apparatus for permitting an observer to observe image information displayed on display means, comprising: reflective display means; an illumination optical system having a reflective surface A for guiding light from light source means to the display means; and a display optical system for guiding light from the display means to an observation position of the observer, wherein when principal rays are defined as rays emerging from a display surface of the display means and impinging upon the center of an exit pupil, when a center-view-angle principal ray is defined as a ray emerging from the center of the display surface of the display means and passing the center of the exit pupil of the display optical system, when illumination principal rays are defined as rays emerging from the light source means and guided onto the display surface by the illumination optical system to become the principal rays, an angle of incidence of each illumination principal ray onto the display surface and an angle of emergence of a corresponding principal ray from the display surface make a predetermined angle, and wherein when a center illumination principal ray is defined as a ray emerging from the light source means and guided to the center of the display surface by the illumination optical system to become the center-view-angle principal ray, when a coordinate system is so defined that a yz plane is set on a surface formed by incidence and emergence of the center illumination principal ray to and from the reflective surface A and that a z-axis is taken along a direction of a normal to the reflective surface A in the yz plane, a y-axis along a tangent direction thereto, and an x-axis along a direction normal to the yz plane, and when the illumination principal rays are projected onto the xz plane of the coordinate system, the illumination principal rays projected onto the xz plane are incident at respective angles of incidence approximately equal to each other to the reflective surface A.

In the above-stated image display apparatus according to a further aspect of the present invention, said reflective surface A acts to totally reflect the light when the light from said light source means is guided to said display means and said reflective surface A acts to transmit the light when the light from the display means is guided to the observation position.

In the above-stated image display apparatus according to a further aspect of the present invention, when the illumination principal rays are projected onto the xz plane of the coordinate system and when θx represents an angle between a normal at a hit point of each illumination principal ray on the reflective surface A and a line of a projection of the each illumination principal ray onto the xz plane of the coordinate system, each illumination principal ray is incident to the reflective surface A so as to satisfy the following condition:

$$|\theta x| \leq 5°.$$

In the above-stated image display apparatus according to a further aspect of the present invention, when the illumination principal rays are projected onto the yz plane of the coordinate system, when θy represents an angle between a normal at a hit point of each illumination principal ray on the reflective surface A and a line of a projection of the each illumination principal ray onto the yz plane of the coordinate system, and when n represents a refractive index of a medium before and after reflection on the reflective surface A, each illumination principal ray is incident to the reflective surface A so as to satisfy the following condition:

$$\arcsin(1/n) \leq \theta y \leq 1.5 * \arcsin(1/n).$$

An image display apparatus according to another aspect of the present invention is an image display apparatus comprising: reflective display means; an illumination optical system having a reflective surface A; and a display optical system for guiding light from the display means to an observation position, said apparatus comprising means whereby when a yz plane is defined as a plane formed by incidence and emergence of a center illumination principal ray to and from the reflective surface A, said center illumination principal ray being defined as a ray guided to the center of a display surface of the display means by the illumination optical system and emerging from the center of the display surface of the display means to pass the center of the exit pupil of the display optical system, and when a coordinate system is so set that a z-axis is taken along a direction of a normal to the reflective surface A in the yz plane, a y-axis along a tangent direction thereto, and an x-axis along a direction normal to the yz plane, illumination principal rays guided onto the display surface of the display means by the illumination optical system and emerging from the display surface of the display means to pass the center of the exit pupil of the display optical system are made incident to and emergent from the display surface of said display means each at a predetermined angle and angles of incidence to the reflective surface A on a projection of the respective illumination principal rays onto the xz plane are controlled so as to be approximately constant.

DETAILED DESCRIPTION OF THE PREFERRED EMBODIMENTS

[Embodiment 1]

Figure 1:
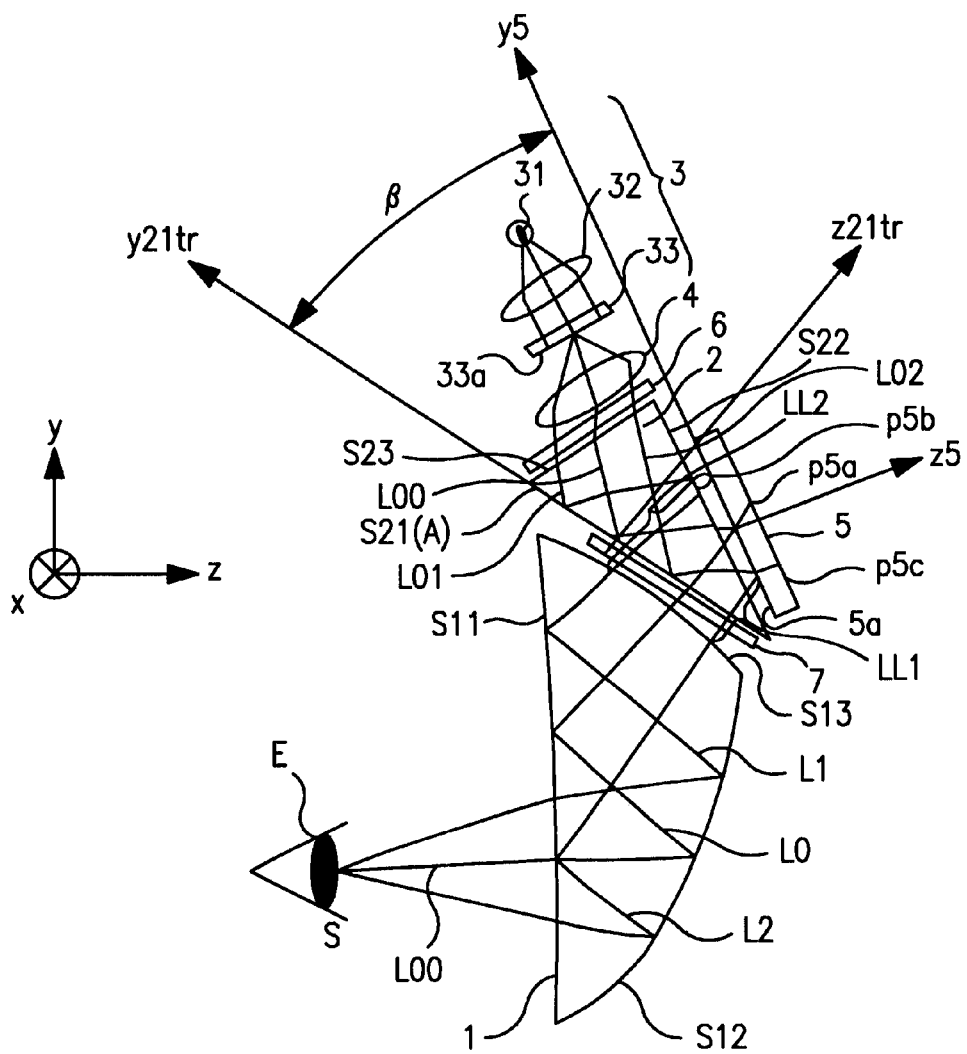
FIG. 1 is a schematic diagram to show the main part of Embodiment 1 of the image display apparatus according to the present invention.

FIG. 1 is a schematic diagram to show the main part of Embodiment 1 of the image display apparatus according to the present invention.

In the figure, reference numeral 1 designates a first optical element, 2 a second optical element, 3 a light source means, 4 a condenser lens, 5 an LCD being a reflective display means, 6 and 7 polarizers whose transmission axes are approximately perpendicular to each other, and each of these components constitutes an element of the image display apparatus of the present embodiment.

The present embodiment will be described employing a global coordinate system in which a yz plane is on the plane of the drawing, the z-axis is taken along the direction of the observer's visual axis (a direction of a center-view-angle principal ray L0, described hereinafter, which enters the observer's pupil E), the y-axis along the direction perpendicular thereto in the plane of the drawing, and the x-axis along the direction normal to the plane of the drawing. The positive direction of each axis is as illustrated for the y- and z-axes and the positive direction of the x-axis is the direction going into the plane of the drawing.

The elements for guiding the light from the light source means 3 to the LCD 5, i.e., the condenser lens 4, the polarizer 6, and surfaces S23, S21, and S22 of the second optical element 2 compose the illumination optical system, and the elements for guiding the reflected light from the LCD 5 to the observer's eye E, i.e., the surfaces S22, S21 of the second optical element 2, the polarizer 7, and surfaces S13, S11, and S12 of the first optical element 1 compose the display optical system of the present embodiment.

Rays emerging from arbitrary points on the display surface 5a of the LCD 5 and impinging on the center of the exit pupil S of the display optical system are called principal rays and, particularly, a ray L0 emerging from the center point p5a of the display surface 5a of the LCD 5 and impinging on the center of the exit pupil S of the display optical system is called a center-view-angle principal ray. Further, rays emerging from the light source means 3 and impinging on arbitrary points on the image display surface 5a of the reflective LCD 5 to become the principal rays are called illumination principal rays and, particularly, a ray L00 emerging from the light source means 3 and impinging on the center point p5a on the image display surface 5a of the reflective LCD 5 to become the center-view-angle principal ray L0 is called a center illumination principal ray.

The light source means 3 forms a surface illuminant consisting of a light source 31, a lens 32, and a diffuser 33, and 33a represents a light-emitting surface of the light source means 3.

The first optical element 1 has a surface S11 which transmits and reflects (totally reflects) light, a reflective surface S12 with a reflective coating formed thereon, and a transmissive surface S13 and is of a prism shape filled with a single medium inside the three surfaces. The surface S13 is an entrance surface through which the light from the reflective LCD 5 is incident into the first optical element 1, the surface S11 and the surface S12 are a plurality of reflective surfaces of the first optical element 1, and the surface S11 also serves as an exit surface for guiding the light out of the first optical element toward the observer's pupil E.

The surface S11 and the surface S12 acting as reflective surfaces are eccentric from the center-view-angle principal ray L0. Particularly, where the refractive index of the material of the first optical element 1 is n1, the ray L0 coming from the surface S13 is made incident at an angle of incidence of not less than arcsin(1/n1) to the surface S11 whereby it is totally reflected by the surface S11 toward the surface S12. The rays reflected by the surface S12 are made incident at angles of incidence of less than arcsin(1/n1) to the surface S11 whereby they travel through the surface S11 out of the first optical element 1. This accomplishes decrease in the number of faces and increase in utilization efficiency of light.

The surface S12 with the strongest power is preferably a rotationally asymmetric surface that is symmetric only with respect to the yz plane and that corrects aberration caused by the eccentric placement of the two reflective surfaces S11, S12. More preferably, these surfaces S11, S12, S13 all are rotationally asymmetric surfaces with symmetry only with respect to the yz plane, whereby the aberration can be corrected well.

The surfaces of the second optical element 2 all are planes in the present embodiment, consisting of the surface S21 which transmits and reflects the light, the transmissive surface S22, and the transmissive surface S23, and the second optical element 2 is of a prism shape filled with a single medium inside the three surfaces. The surface S21 is a reflective surface for guiding the light from the light source means to the display means. The light emerging from one point on the light-emitting surface 33a is condensed by the condenser lens (collimator lens) 4 and only the light transmitted by the polarizer 6 is guided to the second optical element 2. In the present embodiment, where the refractive index of the material of the second optical element 2 is n, each of the illumination principal rays is made incident at an angle of incidence of not less than arcsin(1/n) to the surface S21, so as to be totally reflected. The light totally reflected by the surface S21 travels through the surface S22 and out of the second optical element 2 to illuminate the LCD 5 obliquely at a predetermined incidence angle to the display surface 5a. The light adequately modulated and reflected by the LCD 5 travels through the surface S22 into the second optical element 2, is incident at angles of incidence of not more than arcsin(1/n) to the surface S21 to travel through the surface S21 out of the second optical element 2, and then is subjected to analyzer action according to its states of polarization, in the polarizer 7. The light through the polarizer 7 then travels through the surface S13 into the first optical element, is totally reflected by the surface S11 inclined at an angle over the critical angle to the beam, thereafter is reflected by the surface S12 again toward the surface S11, then travels through the surface S11 this time out of the first optical element to form the exit pupil S, and is guided to the observer's eye E placed approximately at the position of the exit pupil S, whereby the observer is allowed to observe an enlarged view of the image on the LCD 5.

In the present embodiment, the angle β between the display surface 5a of the LCD 5 and the surface S21 of the reflective surface is set as β<45° so as to shorten the optical path lengths between the display surface 5a and the surface S13, which is an advantageous configuration for increase in the angle of view.

In the present embodiment it is more desirable to satisfy the following condition.

$$10° < \beta < 40° \tag{1a}$$

If $\beta$ is below the lower limit of Condition (1a) it will become difficult to guide beams illuminating a one-side region p5c of the display surface 5a, adequately to the exit pupil S. If $\beta$ is over the upper limit the optical path lengths will become long between the displace surface 5a and the surface S13 of the first optical element 1, so as to make it difficult to increase the angle of view.

In the present embodiment it is also preferable in terms of correction for aberration to satisfy the relation of LL1>LL2, where LL1 is a distance from the display surface 5a to the surface S13, of the principal ray L1 emerging from the point p5b being one extreme end of the LCD 5 in the yz plane and impinging on the center of the exit pupil S and LL2 is a distance from the display surface 5a to the surface S13, of the principal ray L2 emerging from the point p5c being the other extreme end and impinging on the exit pupil S. In the present invention the thinner side of the second optical element 2 is placed on the side close to the point p5c and the thicker side on the side close to the point p5b.

In the present embodiment the surface S22 of the second optical element 2 and the display surface 5a of the LCD 5 are approximately parallel to each other, and the apex angle of the second optical element is also $\beta$. In the present embodiment the principal rays emerging from the display surface 5a of the LCD 5 are emergent each at a predetermined angle, and the relation between the apex angle $\beta$ and the angle of emergence of each principal ray from the display surface 5a is set so as to shorten the optical path length from the display surface 5a to the surface S13 of the first optical element 1, thus realizing a more advantageous configuration for the increase in the field of view.

Particularly, where $\gamma$ represents an angle between the illumination principal ray L02 impinging on the point p5c and the principal ray L2 emerging from the point p5c, it is preferable to satisfy the following relation.

$$2 \cdot \arcsin(0.1 \cdot n) \leq \gamma$$

If $\gamma$ is below this lower limit the aforementioned optical path length LL2 will become longer, which is disadvantageous in correction for aberration or in increase of the angle of view. This condition is for the situation wherein the medium before and after the reflection at the display surface 5a is an air layer as in the present embodiment, and in the case wherein a cover glass or the like is placed in front of the display surface as in the numerical example described hereinafter, $\gamma$ is an angle between an extension line of the illumination principal ray incident to the cover glass and an extension line of the principal ray emerging from the cover glass.

Figure 2:
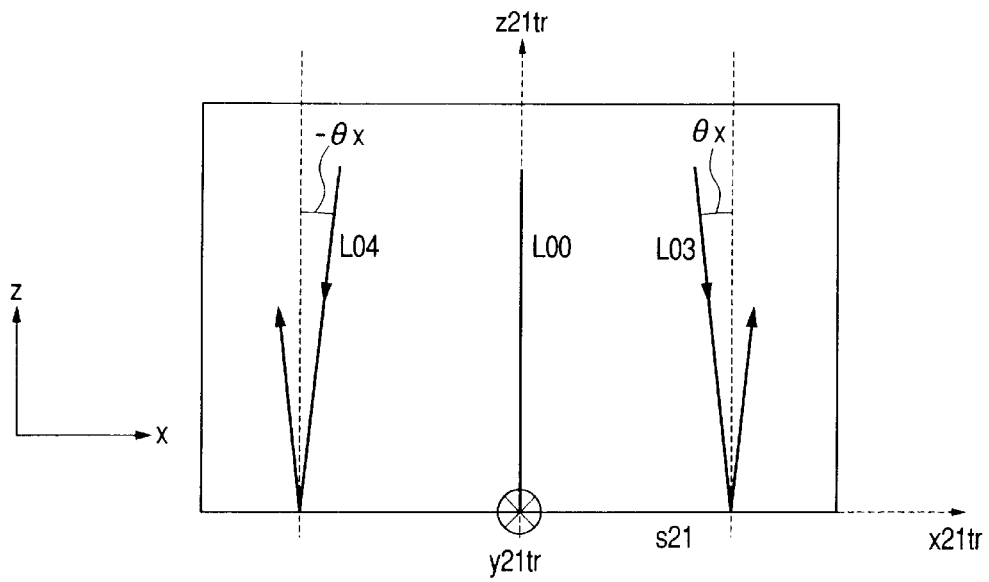
FIG. 2 is an xz cross-sectional view of a second optical element in Embodiment 1 of the image display apparatus according to the present invention.
Figure 13:
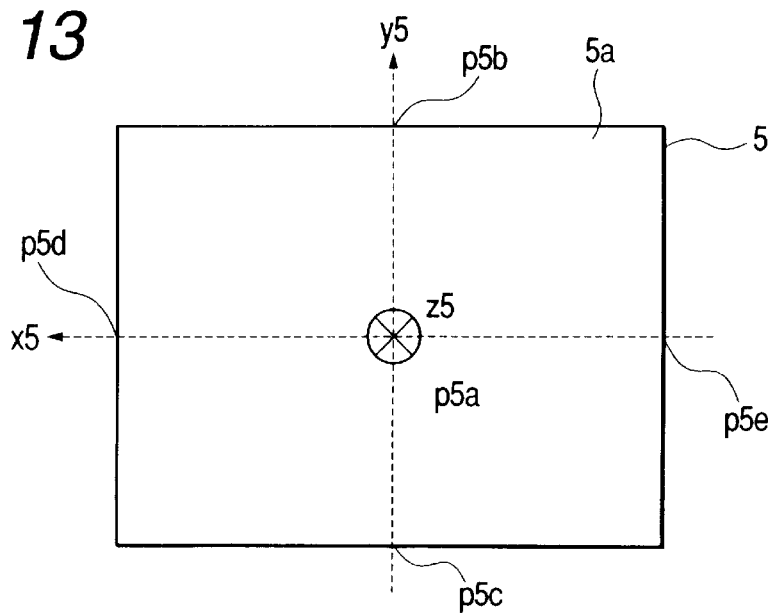
FIG. 13 is a schematic front view of the display surface of the reflective display means in Embodiment 1 of the present invention.

FIG. 2 is an x21tr-z21tr cross-sectional view in a local coordinate system (defined by three axes of x21tr, y21tr, and z21tr) upon the total reflection of light on the surface S21 of the second optical element 2 of FIG. 1. FIG. 13 is a front view of the display surface 5a of the LCD 5 and is an x5-y5 cross-sectional view in a local coordinate system having axes of x5, y5, and z5 on the display surface 5a of the LCD 5 illustrated in FIG. 1.

FIG. 2 shows the center illumination principal ray L00 which is incident to the center p5a of the effective display screen of the LCD 5 and which is reflected by the LCD 5 to become the center-view-angle principal ray passing the center of the exit pupil S by the display optical system, and illumination principal rays L03, L04 which are horizontally shifted from the center of the LCD 5 so as to be incident to the extreme ends (the point p5d and the point p5e in FIG. 13) and which are reflected by the LCD 5 to become principal rays passing the center of the exit pupil S by the display optical system.

In the present embodiment the center illumination principal ray L00 is projected onto the z21tr axis which is a normal to the surface S21 in the cross section of FIG. 2. In the present embodiment, each of the illumination principal rays L03, L04, when projected onto the cross section of FIG. 2, makes an angle of $\pm\theta x$ with a normal at a hit point of each illumination principal ray on the surface S21.

The gist of the present invention is to present an image with less luminance nonuniformity in the screen and with high contrast to the observer whose eye E is placed at the position of the exit pupil S of the display optical system by controlling $\theta x$ to an appropriate value, and $\theta x$ is set as follows.

$$|\theta x| \leq 5° \tag{1}$$

FIG. 2 was described using the illumination principal rays L03, L04 becoming the principal rays emerging from the point p5d and the point p5e on the display surface 5a of the LCD 5 and impinging on the center of the pupil S, but above Condition (1) is a condition to be met by each of all the illumination optical rays becoming arbitrary principal rays (rays emerging from arbitrary points on the display surface 5a and guided to the center of the pupil S).

Next, the principle of degradation of contrast with increase in this angle $\theta x$ will be described referring to FIGS. 3, 4A, 4B, and 5A, 5B.

FIGS. 3, 4A, 4B, and 5A, 5B are drawings for explaining the principle of change in polarization states.

Figure 3:
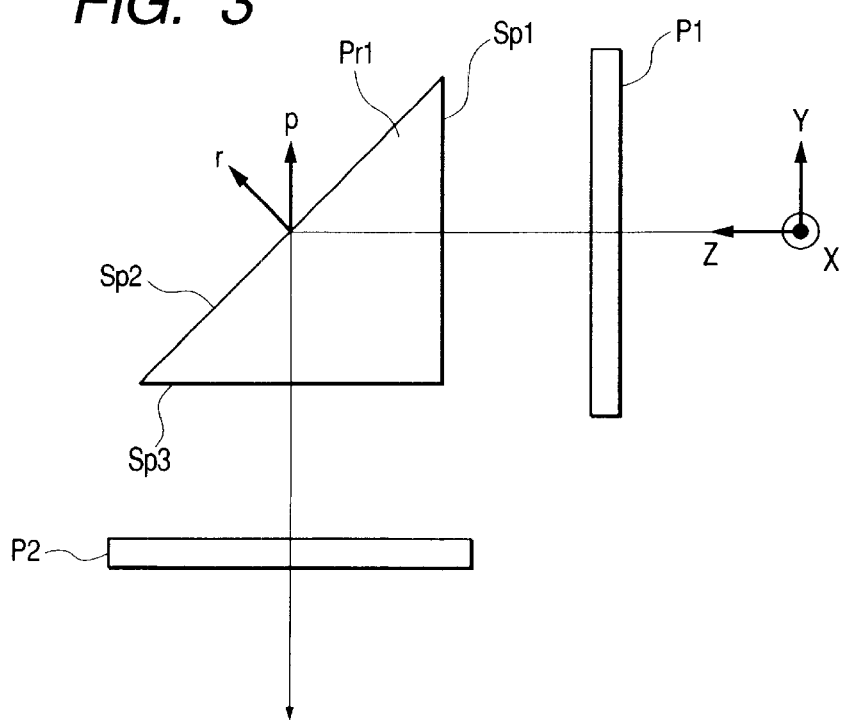
FIG. 3 is a diagram to show an optical system for explaining the principle of change in polarization states in the present invention.

FIG. 3 is a cross-sectional view for explaining a system for the description of the principle, in which P1 and P2 represent polarizers whose transmission axes of polarization are orthogonal to each other, which are equivalent to the polarizers 6, 7 of FIG. 1. Symbol Pr1 denotes a prism having surfaces Sp1, Sp2, and Sp3, which is of an isosceles triangle shape in which the surfaces Sp1 and Sp3 have equal lengths in the cross section of this figure. The prism Pr1 is equivalent to the second optical element 2 of FIG. 1.

In this description, the effect of refraction at the surface Sp1 and at the surface Sp3 on the polarization will be ignored for simplicity of description.

In FIG. 3, the reference is defined along a ray passing the centers of the respective surfaces Sp1, Sp2, Sp3 of the prism Pr1 and a global coordinate system is set to a coordinate system wherein a Y-axis and a Z-axis are taken along the reference as illustrated and an X-axis is taken along a direction coming out of the plane of the drawing. The direction of a normal at the center point of the surface Sp2 is represented by r and change in polarization states will be described hereinafter using the ray incident to the center point of the surface Sp2. The polarizer P1 has its transmission axis along the direction of the Y-axis and the polarizer P2 its transmission axis along the direction of the X-axis.

FIGS. 4A, 4B and FIGS. 5A, 5B are drawings for explaining the change in polarization states of a ray having a different inclination in the YZ plane and entering the center of the surface Sp2 and a ray having a different inclination in the XZ plane and entering the center of the surface Sp2, respectively, with respect to the ray of the reference.

Figure 4A:
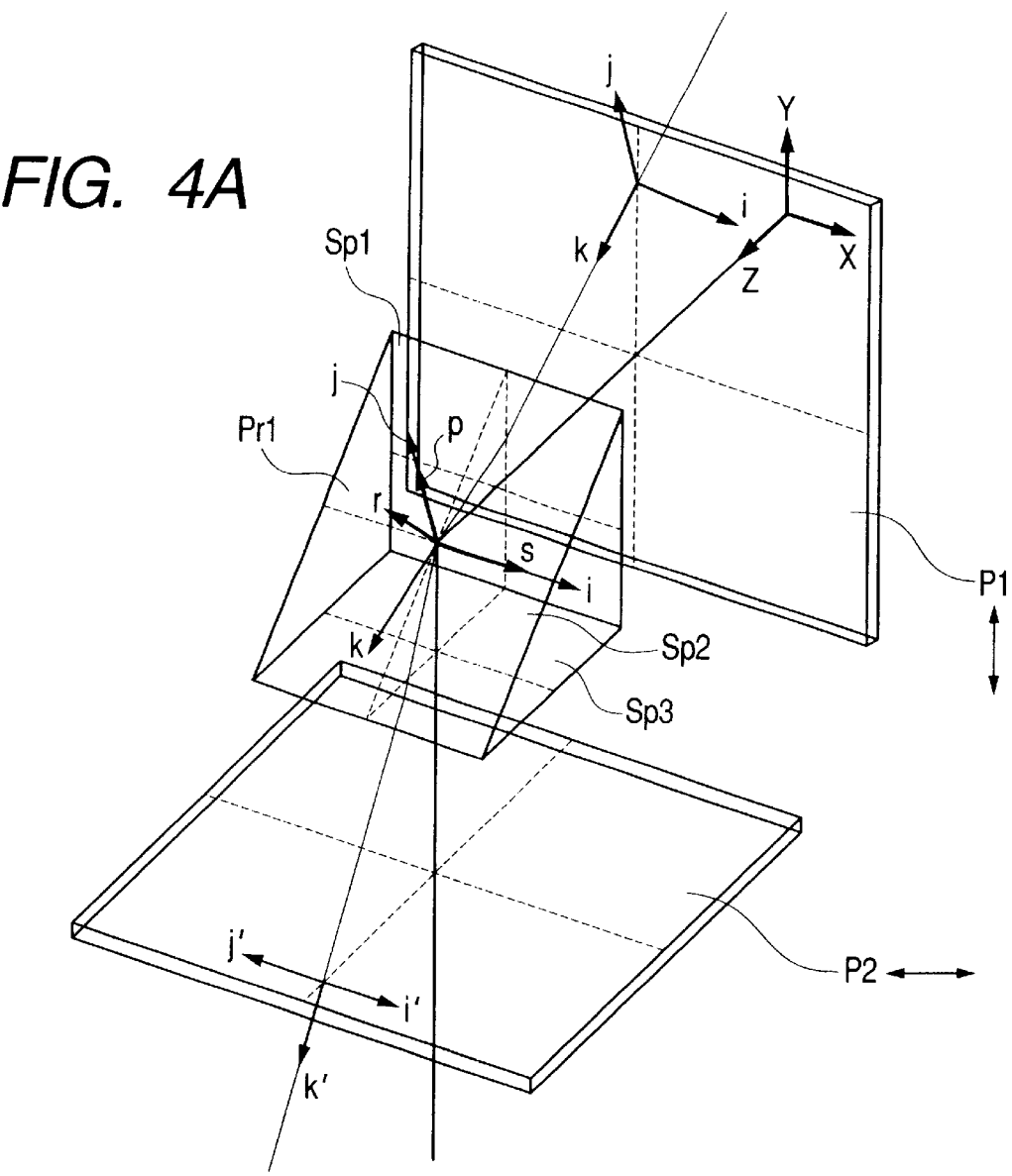
FIG. 4A and FIG. 4B are diagrams for explaining change in polarization states of a ray inclined in the y-direction in the present invention.
Figure 4B:
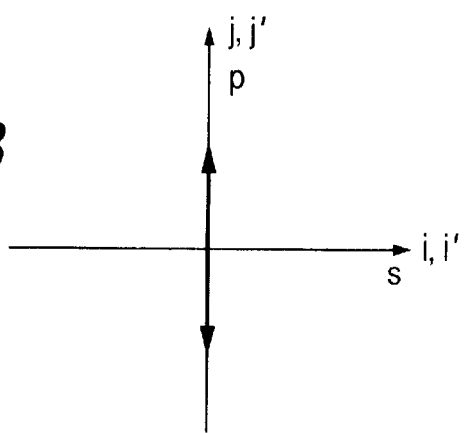

In FIGS. 4A and 4B, the polarizer P1 has the transmission axis along the Y-axis direction. Here let us define an i-axis along a direction of a normal to a plane including a directional vector k of the ray and the Y-axis, and a j-axis along a direction of a normal to a plane including the directional vector k of the ray and the i-axis. Then the ray passing the polarizer P1 becomes linearly polarized light whose vibration direction is the direction of the j-axis.

The normal vector r to the reflective surface is within the YZ plane. The s-axis runs along the direction of a normal to a plane including the normal vector r to the reflective surface and the ray-directional vector k, and the p-axis along a direction of a normal to a plane including the ray-directional vector k and the s-axis. The linearly polarized light with the vibration direction along the direction of the s-axis is so called "s-polarized light" and the linearly polarized light with the vibration direction along the direction of the p-axis is so called "p-polarized light".

The angle $\theta x$ is defined as an angle of inclination when the directional vector k of the incident ray to the reflective surface is projected onto the XZ plane. When $\theta x=0$, the directional vector k is present in the YZ plane as illustrated in FIG. 4A. Since the directional vector k, the Y-axis, and the normal vector r all are present in the YZ plane, the i-axis agrees with the s-axis and the j-axis does with the p-axis. Therefore, the incident ray includes only the p-polarization component. Since the directional vector k' of the reflected ray is also present in the YZ plane, the i'-axis agrees with the s-axis, and the j'-axis with the p-axis. Therefore, the reflected ray is linearly polarized light with the vibration direction along the direction of the j'-axis. FIG. 4B is a figure in which the direction of the directional vector is set along the direction normal to the plane of the drawing and which shows the axes and polarization states of the incident light and reflected light at that time.

Figure 5A:
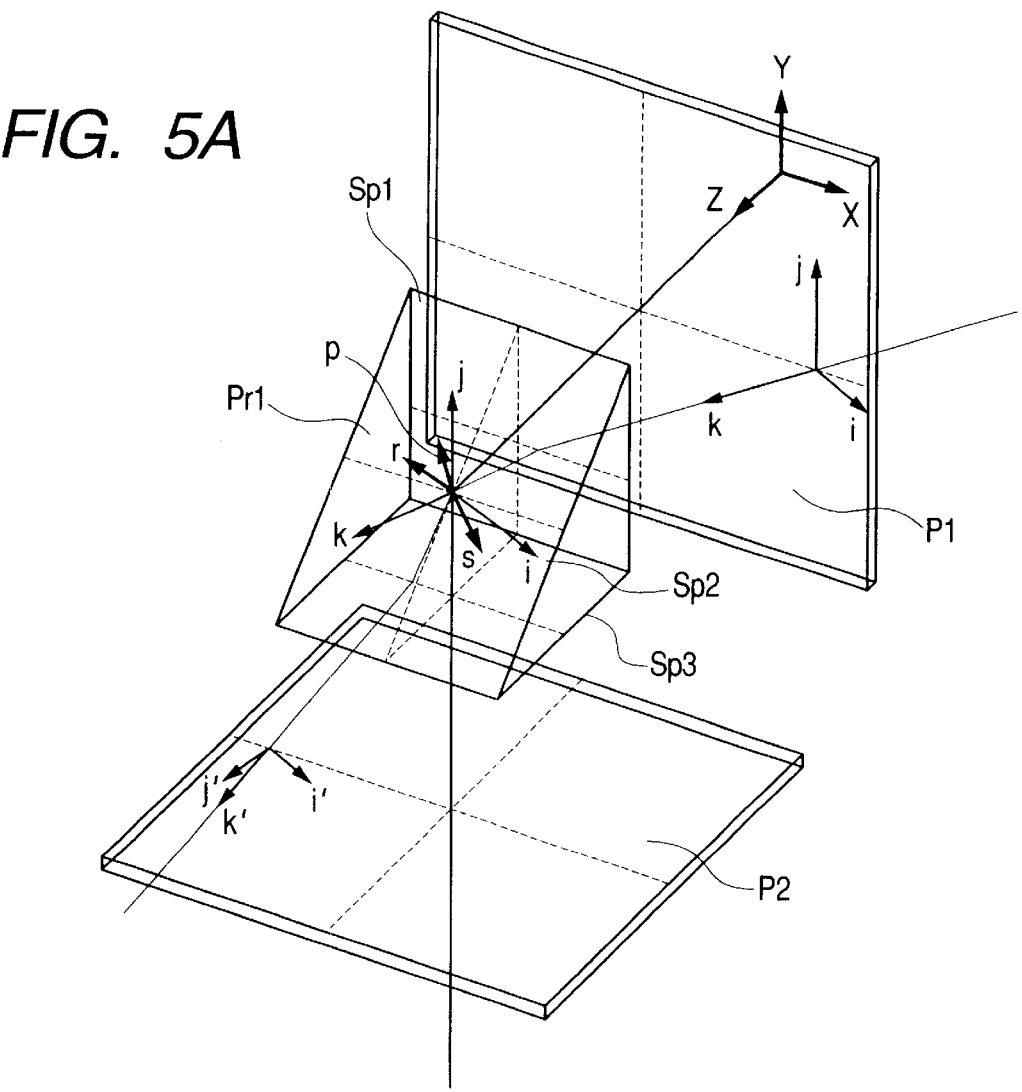
FIG. 5A and FIG. 5B are diagrams for explaining change in polarization states of a ray inclined in the x-direction in the present invention.

On the other hand, when $\theta x \neq 0$, the directional vector k is not present in the YZ plane, as illustrated in FIG. 5A. Therefore, the i-axis does not agree with the s-axis and the j-axis does not agree with the p-axis. The s-axis and the p-axis are rotated by an angle $\alpha$ relative to the i-axis and the j-axis, respectively. The incident ray thus has both s-polarization and p-polarization components. The amplitudes of the respective components are given by $As=A \times \cos\alpha$ and $Ap=A \times \sin\alpha$, where A is the amplitude of the incident ray. The intensity reflectance on the total reflection surface is 1 for both the s-polarized light and the p-polarized light, but the complex amplitude reflectance is different between them. Thus the reflected light has a phase difference $\delta$. The amount of the phase difference $\delta$ is given by the following equation. In the equation n designates the refractive index of the material of the prism and $\theta$ an angle of incidence to the reflective surface.

$$\delta = 2 \times \tan^{-1}[\{\cos\theta(n^2\sin^2\theta-1)^{1/2}\}/(n\sin^2\theta)]$$

Figure 5B:
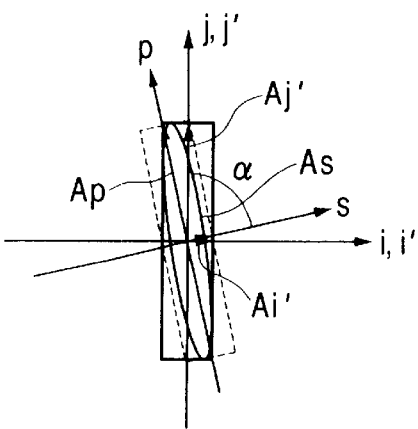

Therefore, the reflected light is elliptically polarized light in general. Since the directional vector k' of the reflected ray is also absent from the YZ plane, the i'-axis does not agree with the s-axis and the j' axis does not agree with the p-axis. The reflected light is thus elliptically polarized light having the components with the amplitudes of Ai', Aj' along the i'-axis and along the j'-axis, respectively, as illustrated in FIG. 5B. FIG. 5B is a figure in which the direction of the directional vector is set along the direction normal to the plane of the drawing and which shows the axes and the polarization states of the incident light and the reflected light at that time.

In FIG. 4A and FIG. 5A, the polarizer P2 has the transmission axis along the direction of the X-axis and transmits only the component having the vibration direction along the direction of the i'-axis. In the case of $\theta x=0$, the incident light to the polarizer P2 is thus cut off (or absorbed) by the polarizer P2, because it is the linearly polarized light having the vibration direction along the direction of the j'-axis. In the case of $\theta x \neq 0$, since the incident light to the polarizer P2 is the elliptically polarized light as illustrated in FIG. 5B, the component along the i'-axis is transmitted by the polarizer P2 and thus the transmitted light has the intensity of (Ai') 2. As described, even if the polarizers P1 and P2 are placed with their transmission axes perpendicular to each other leakage of light will occur if the reflective surface exists in the optical path between the two polarizers and if the incident light to the reflective surface is not present in the plane including the transmission axis of the polarizer P1 and the normal to the reflective surface. More precisely, the behavior is more complex, because the polarization states are affected by the difference of intensity transmittance due to the refraction at the surface Sp1 and at the surface Sp2.

Next, a configuration wherein the optical element including the reflective surface is applied to the illumination system of the reflective liquid-crystal display 5, will be described referring to FIG. 6.

The light from the light source travels through the polarizer 6 to become the linearly polarized light and then the linearly polarized light is incident through the surface S23 into the prism 2. The light is incident at an angle greater than the critical angle to the surface S21 to be reflected and the reflected light travels through the surface S22 out of the prism 2 to enter the reflective liquid-crystal display 5. The light reflected by the reflective liquid-crystal display 5 is again incident through the surface S22 into the prism 2 and is then incident at an angle less than the critical angle to the surface S21 to be refracted. The light then travels out of the prism 2 to enter the polarizer 7. The light traveling through the polarizer 7 is guided to the display optical system. The polarizers 6 and 7 are placed with their transmission axes being perpendicular to each other.

Control of on/off of display is implemented by changing the state of the liquid crystal so as to change the polarization state of the reflected light from that of the entering light. An example will be described as to a case using the ferroelectric liquid crystal as the liquid crystal. An amount of retardation of the liquid crystal is set to a quarter wavelength (i.e., a half wavelength in the forward and backward paths due to reflection), the direction of the director of the liquid crystal 5 is matched with the direction of the transmission axis of the polarizer 6 in the case of off display, and the direction of the director is set in a state inclined at 45° relative to the transmission axis of the polarizer 6 in the case of on display. Since during the off display the light is reflected with the polarization state of the incident light being preserved, the reflected light is the linearly polarized light having the vibration direction along the direction of the transmission axis of the polarizer 6 and is thus intercepted by the polarizer 7. Since during the on display the vibration direction of the linearly polarized light is rotated by 90°, the reflected light has its vibration direction agreeing with the transmission axis of the polarizer 7 and is thus transmitted by the polarizer 7.

Even under this setting, however, when the incident light to the total reflection surface is not present in the plane including the transmission axis of the polarizer 6 and the normal to the total reflection surface ($\theta x \neq 0$), the incident light to the liquid crystal is not the linearly polarized light for the reason presented in FIGS. 5A and 5B and thus part thereof travels through the polarizer 7 even during the off display. This poses the problem of degradation of contrast.

Although the above description concerns the case of the reflective surface being the total reflection surface, the phenomenon described above also occurs on either of a metal mirror surface, a half mirror surface, and a dielectric multilayer coat surface, because the complex amplitude reflectances of the s-polarized light and p-polarized light are normally different from each other on ordinary reflective surfaces.

Figure 6:
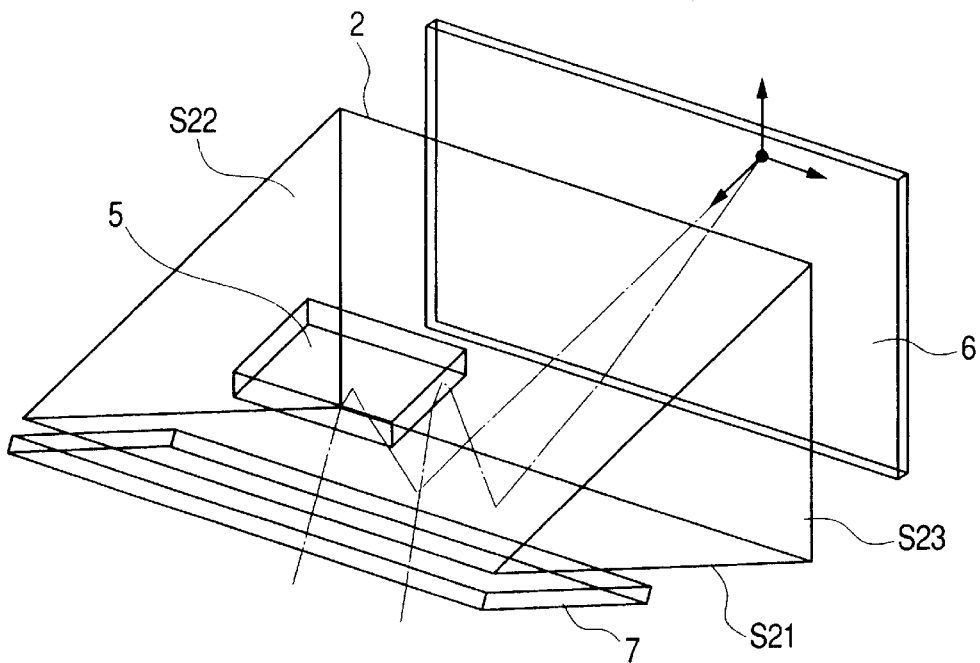
FIG. 6 is a diagram to explain change in polarization states in a case using a reflective surface in the illumination system for the reflective liquid crystal display.
Figure 7:
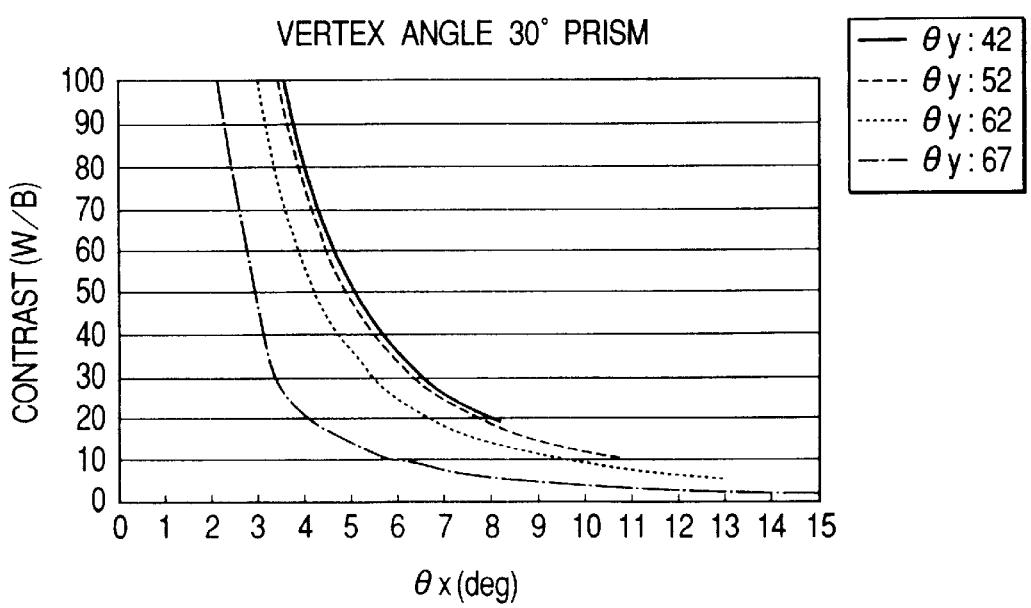
FIG. 7 is a diagram to show the simulation result for angles θx between the reflective surface of the illumination system for the reflective liquid crystal display and rays.

FIG. 7 is a diagram to show the simulation result of the relation with θx for rays passing through the polarizer 7 in paths of rays from the polarizer 6 to the polarizer 7 in a configuration wherein the angle between the surface S21 and the surface S22 of the prism 2 illustrated in FIG. 6 is 30°, the angle between the surface S22 and the surface S23 is 90°, and the angle between the surface S23 and the surface S21 is 60°. In this simulation, the LCD 5 was defined as a retarder with the ideal retardation amount of a quarter wavelength (i.e., a half wavelength in the forward and backward paths due to reflection), the director was assumed to be directed in the direction of 0° upon off but in the direction inclined at 45° upon on with respect to the transmission axis of the polarizer 6, and a ratio of light quantities of the light through the polarizer 7 upon off to upon on was defined as contrast. The medium of the prism 2 was assumed to have the refractive index of 1.5. It is seen from the figure that the contrast is lowered with increase in θx. This means that the quantity of transmitted light of off display increases while the quantity of transmitted light of on display decreases with increase in θx and thus there appears luminance nonuniformity in the screen in display of a uniform image such as display of a complete white screen or display of a complete black screen.

FIG. 7 also shows a plurality of curves with change in θy and it is seen from the figure that the contrast varies with change in the angle θy between a projection of the illumination principal ray onto the yz plane (the plane of the drawing of FIG. 1 etc.) and the normal to the surface S21. It is seen from the figure that the contrast is less sensitive to the change of θy than to the change of θx. It is feasible to accomplish the image display apparatus with satisfactory contrast, with unobtrusive luminance nonuniformity or the like in the screen, and with high contrast if θx is within ±5°, though there is some variation depending upon the condition of θy. Therefore, in the embodiments of the present invention, the optical system is constructed to satisfy $|θx|≦5°$ so that projections of the illumination principal rays onto the xz plane are incident approximately in parallel. Over this range the contrast is considerably lowered, which is not preferable. More desirably, the angle θy satisfies the relation of $\arcsin(1/n)≦θy≦1.5*\arcsin(1/n)$, which can control the lowering of contrast within a small range against change of θy and which can assure further high contrast. Below the lower limit there occurs no total reflection, whereas over the upper limit the lowering of contrast becomes prominent.

Next, the optical action of the present embodiment will be described referring to FIG. 1.

A group of rays diverging from one point on the light-emitting surface 33a, which is formed by the light source 31, the lens 32, and the diffuser 33, are converted into a beam of nearly parallel rays to each other (the term "nearly" herein means "within ±5°") by the condenser lens 4, the beam travels through the polarizer 6 to become linearly polarized light, and it is guided to the second optical element 2.

The group of linearly polarized rays are incident through the surface S23 into the second optical element 2, then are totally reflected by the surface S21, are refracted and transmitted by the surface S22 to go out of the second optical element 2, and illuminate the LCD 5. Since the optical system is arranged so that the illumination principal rays to become the principal rays in the display optical system (2, 7, 1) make their respective angles θx approximately parallel to each other to the normal to the surface S21 on the projection of the principal rays onto the x21tr-z21tr cross section in the local coordinate system at the total reflection on the surface S21, particularly, so that $|θx|≦5°$, they are incident to the LCD 5 in a state in which the components other than the linearly polarized light component by the polarizer 6 are small, and are thus subject to modulation by the LCD 5 under the situation close to the ideal state. The light adequately modulated and reflected by the LCD 5 is again incident through the surface S22 into the second optical element 2 and then is guided through the surface S21 this time to the polarizer 7.

Since the relation of $|θx|≦5°$ is met so as to reduce the components other than the linearly polarized light component by the polarizer 6, almost all the light not modulated by the LCD 5 is absorbed by the polarizer 7, while almost all the light with the phase shift of π/2 by the LCD 5 is transmitted by the polarizer 7. The transmitted light travels through the surface S13 into the first optical element 1 toward the surface S11 and is totally reflected by the surface S11 inclined at an angle over the critical angle relative to these rays of light. Thereafter, the light is reflected by the surface S12 and is refracted and transmitted by the surface S11 this time. Then the light goes out of the first optical element 1 to form the exit pupil S and then is guided to the observer's eye E placed approximately at the position of the exit pupil S, whereby the observer is allowed to observe an enlarged view of the image on the LCD 5 with high contrast.

[Embodiment 2]

Figure 8:
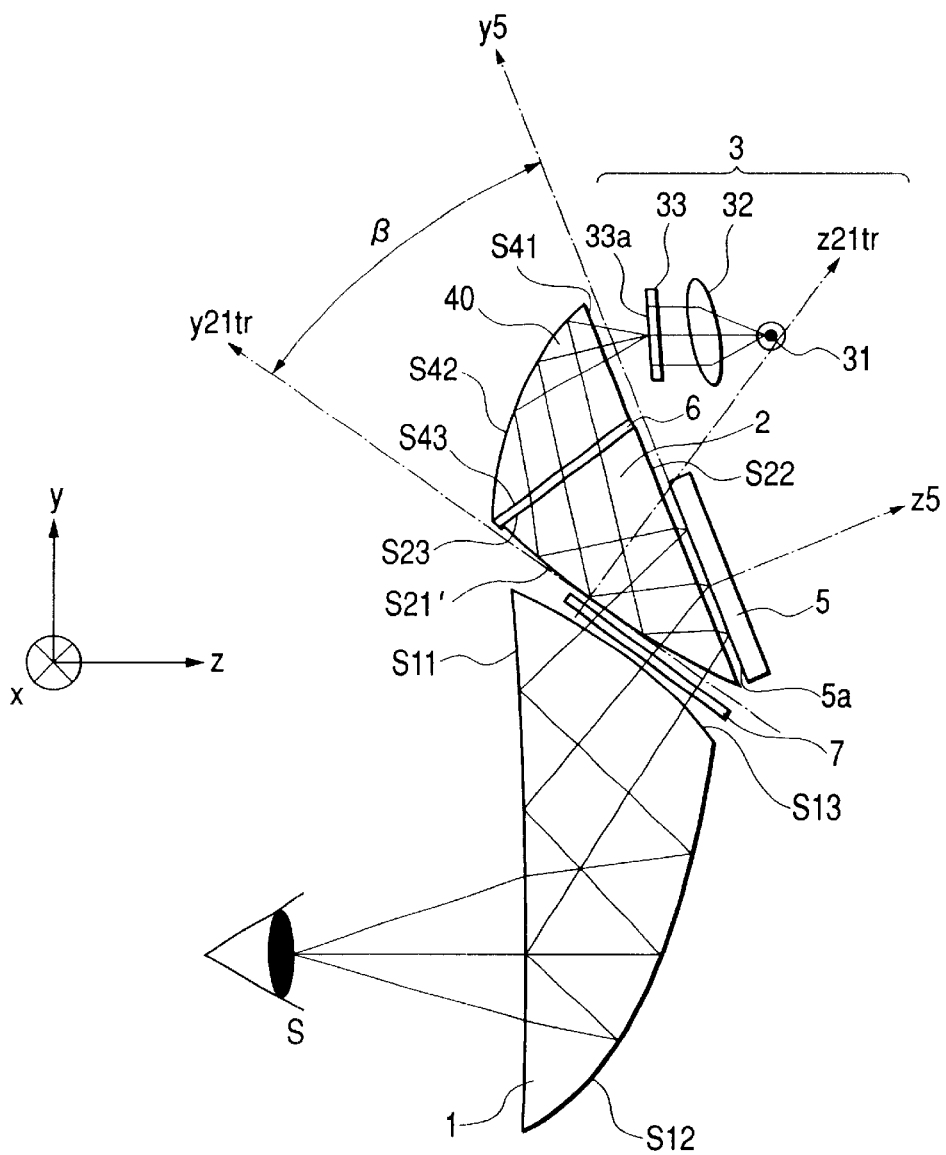
FIG. 8 is a schematic diagram to show the main part of the second embodiment of the present invention.

FIG. 8 is a schematic diagram to show the main part of Embodiment 2 of the present invention. The present embodiment is different from Embodiment 1 only in that the collimator lens 4 is replaced by a prism 40 having a reflective surface S42 and transmissive surfaces S41, S43 and the polarizer 6 is bonded to the prism 40 and to the second optical element 2 and in that the surface for totally reflecting the illumination light in the second optical element 2 (the surface refracting and transmitting the light from the reflective LCD 5 and letting the light go out of the second optical element) is comprised of a curved surface S21' with curvature only in the yz cross section, but the other structure is the same. The same components as in Embodiment 1 will be denoted by the same reference symbols and the description thereof will be omitted. The axes of x21tr, y21tr, and z21tr to determine the local coordinate system at the total reflection on the surface S21' are defined so that the z21tr axis is taken along a direction of a normal at a hit point of the center illumination principal ray on the surface S21', the y21tr axis along the tangent direction in the plane of the drawing, and the x21tr axis normal to the plane of the drawing.

Just as in Embodiment 1, the components for guiding the light from the light-emitting surface 33a to the LCD 5 compose the illumination optical system of the present embodiment, and the components for guiding the reflected light from the LCD 5 to the observer's eye E the display optical system of the present embodiment. The illumination optical system of the present embodiment has the two reflective surfaces, and the reflective surface for guiding the light from the light source means 3 to the display means is S21' which is the final reflective surface in the optical path from the light source means 3 to the reflective LCD 5.

The optical action in the present embodiment will be described below.

A group of rays diverging from one point of the surface illuminant 3, the light-emitting surface of which is the light-emitting surface 33a formed by the light source 31, the lens 32, and the diffuser 33, are incident through the surface S41 into the prism 40 and then are reflected by the curved reflective surface 42 to become approximately parallel to each other. After that, the rays are incident through the joint surface S43 with the polarizer 6 into the polarizer 6. The polarizer 6 absorbs the components other than the linearly polarized light component parallel to the plane of the drawing and then the light is incident through the joint surface S23 with the second optical element 2 into the second optical element 2. The group of linearly polarized rays incident through the surface S23 into the second optical element are totally reflected by the curved surface S21' having the curvature only in the yz cross section and thereafter are refracted and transmitted by the surface S22 to go out of the second optical element and then illuminate the LCD 5. Here the optical system is arranged so that the illumination principal rays to become the principal rays at the respective angles of view make their respective angles θx approximately parallel to each other to the normal to the curved surface S21' on the projection of the rays onto the x21tr-z21tr cross section in the local coordinate system at the total reflection on the curved surface S21', particularly, so that $|\theta x| \leq 5°$. This makes the rays incident to the LCD 5 in a state in which the components other than the linearly polarized light component by the polarizer 6 are small, so that the modulation by the LCD 5 is effected under the condition close to the ideal state.

In the present embodiment, since the total reflection surface S21' of the second optical element is the surface having the curvature in the yz cross section, it is preferable to configure the system so as to satisfy the relation of $\arcsin(1/n) \leq \theta y \leq 1.5*\arcsin(1/n)$, where θy is an angle between a line of a projection of each illumination principal ray becoming a principal ray at each angle of view onto the yz cross section, and a normal at a hit point of each illumination principal ray to the surface.

The light adequately modulated and reflected by the LCD 5 is again incident through the surface S22 into the second optical element 2 and is then guided through the surface S21' this time to the polarizer 7. Since the condition of the angle θx at the surface S21' is set to $|\theta x| \leq 5°$ so as to decrease the components other than the linearly polarized light component by the polarizer 6, almost all the light not modulated by the LCD 5 is absorbed by the polarizer 7, while almost all the light with the phase shift of π/2 by the LCD 5 is transmitted by the polarizer 7. The transmitted light travels through the surface S13 into the first optical element toward the surface S11 and is totally reflected by the surface S11 inclined at the angle over the critical angle to the light. Thereafter, the light is reflected by the surface S12 and is refracted and transmitted this time by the surface S11 to go out of the first optical element and form the exit pupil S. The light is thus guided to the observer's eye E placed approximately at the position of the exit pupil S, whereby the observer is allowed to observe an enlarged view of the image on the LCD 5 with high contrast.

Since the present embodiment is also constructed, similar to Embodiment 1, in such structure that the rays emerging from the center of the light-emitting surface 33a of the light source means 3 are converted so as to be approximately parallel to each other at least in the cross section normal to the plane of the drawing by the prism body 40, that then the rays are guided to the polarizer 6 to be transmitted thereby, and that thereafter the rays are incident to the total reflection surface S21' of the second optical element, dispersion is little in angles of incidence of the illumination principal rays to the total reflection surface in the cross section normal to FIG. 8 and dispersion is little in the angles θx between the rays projected onto the mentioned cross section and the normal to the surface S21', thereby suppressing occurrence of luminance nonuniformity in the screen.

Particularly, for the same reason as in Embodiment 1, the present embodiment satisfies the conditions of $|\theta x| \leq 5°$ and $\arcsin(1/n) \leq \theta y \leq 1.5*\arcsin(1/n)$, whereby the apparatus can present the image with high contrast but with little luminance nonuniformity in the screen to the observer. Since the surface S21' is the curved surface, the display optical system has the increased number of surfaces with power and thus the number of power-allocated surfaces is increased in the display optical system. This can decrease a power share of each surface and also presents the advantage of facilitating the correction for aberration.

[Embodiment 3]

Figure 14:
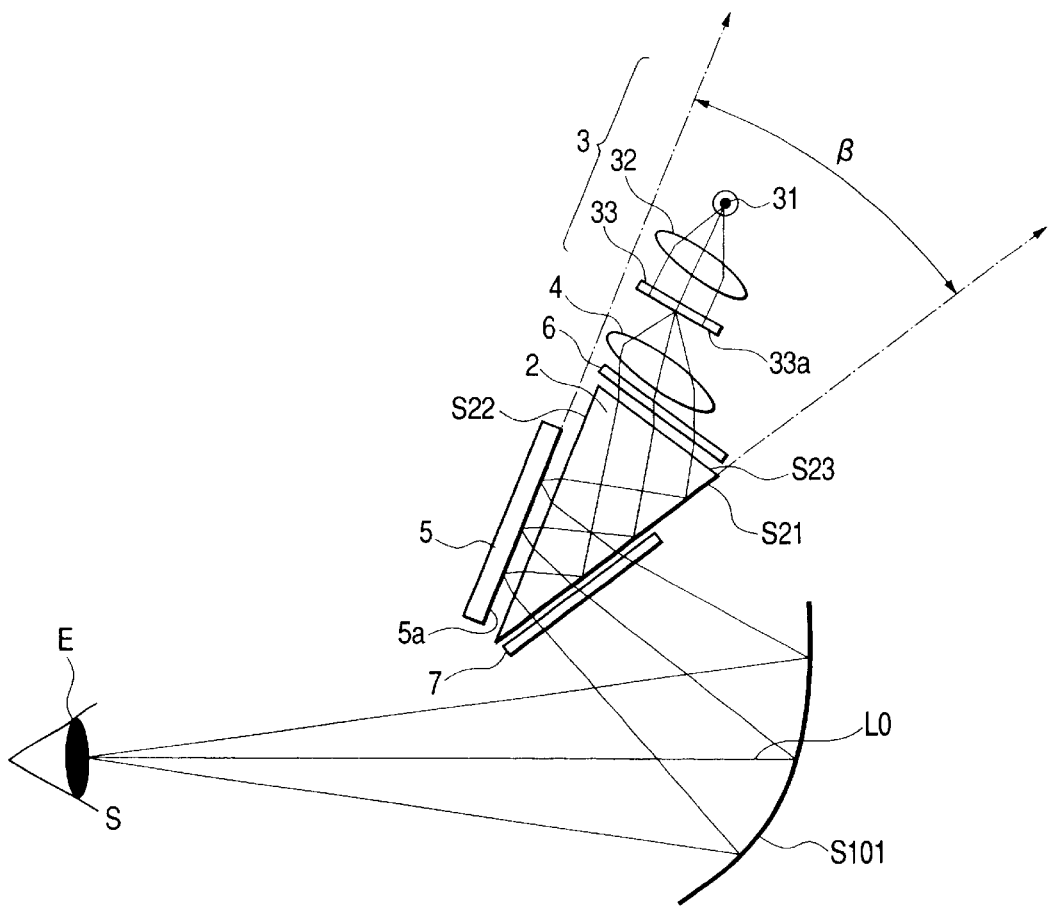
FIG. 14 is a schematic diagram to show the main part of Embodiment 3 of the image display apparatus according to the present invention.

The present invention has been described above with Embodiments 1 and 2 thereof using the first optical element 1 as a part of the display optical system, but it is noted that the present invention is by no means intended to be limited to these embodiments. FIG. 14 is a schematic diagram to show the main part of Embodiment 3 wherein the illumination optical system with the reflective surface for guiding the light from the light source means to the display means, which is the feature of the present invention, is combined with another optical system. The present embodiment is different from Embodiment 1 only in that an optical system consisting of one mirror surface S101 is used instead of the first optical element 1, but the other structure is the same. Therefore, the description of reference numerals will be omitted. In the present embodiment, the elements for guiding the light from the light source means 3 to the LCD 5, i.e., the condenser lens 4, the polarizer 6, and the surfaces S23, S21, S22 of the second optical element 2 also compose the illumination optical system.

The surface S101 is, for example, one obtained by decentering a mirror of the spherical shape relative to the center-view-angle principal ray L0, and the display optical system is composed of the elements for guiding the reflected light from the LCD 5 to the observer's eye E, i.e., the surfaces S22, S21 of the second optical element 2 and the surface S101.

The diverging light from the light-emitting surface 3a of the light source means 3 is converted into a beam of nearly parallel light by the lens 4 and the beam is transmitted by the polarizer 6 to become a beam of linearly polarized light in a specific direction. The linearly polarized light is guided through the surface S23 into the second optical element 2 and is totally reflected by the surface S21 which is a reflective surface A. Then the light travels through the surface S22 out of the second optical element 2 to illuminate the reflective LCD 5. The light is properly modulated and reflected by the reflective LCD 5 and the reflected light is incident through the surface S22 into the second optical element 2. The light travels through the surface S21 this time out of the second optical element 2 and is then subjected to the analyser operation according to the states of modulation, in the polarizer 7 whose transmission axis of polarization is approximately perpendicular to that of the polarizer 6. The light transmitted by the polarizer 7 is reflected by the surface S101 to be guided to the observer's eye E placed at the position of the exit pupil S of the display optical system, whereby the observer is allowed to recognize an enlarged image of the image displayed on the LCD 5.

In the present embodiment, just as in the aforementioned embodiments, display of the image with high contrast is achieved by making the illumination principal rays incident in the approximately parallel state to the surface S21. Particularly, the optical system is arranged so as to satisfy the following condition concerning the angle θx between the normal to the surface S21 and a projected line of each illumination principal ray onto a plane including a normal to the surface S21 and being normal to the plane of the drawing.

$$|\theta x| \leq 5° \qquad (1)$$

It is also preferable to satisfy the following relation concerning the angle θy between the normal to the surface S21 and a projected line of each illumination principal ray onto the plane of the drawing, thereby accomplishing display of an image with much higher contrast.

$$\arcsin(1/n) \leq \theta y \leq 1.5 * \arcsin(1/n)$$

(where n is the refractive index of the medium of the second optical element 2.)

In the present embodiment the surface S101 is the spherical surface, but it is preferable in terms of correction for aberration to construct it of a rotationally asymmetric surface that is symmetric with respect to the plane of the drawing.

Figure 15:
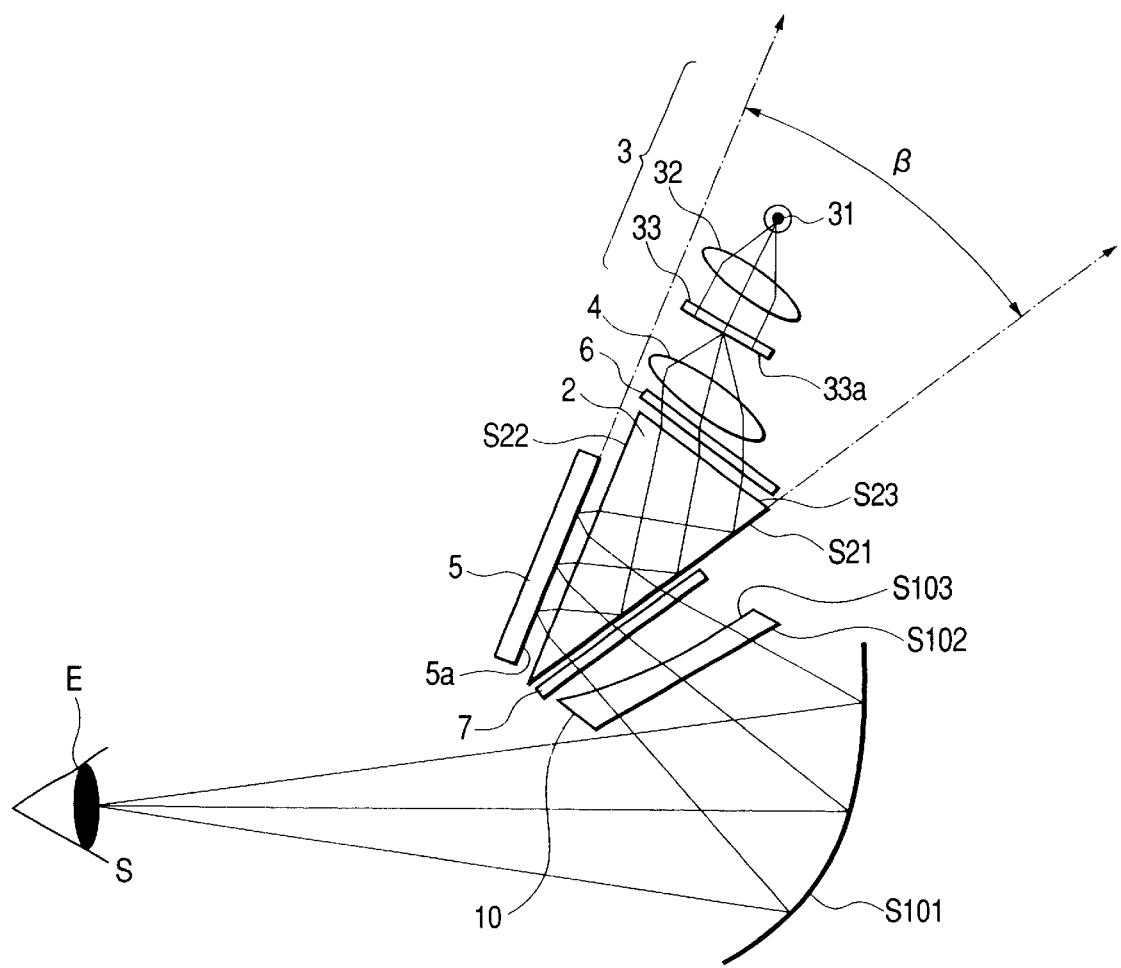
FIG. 15 is a schematic diagram to show the main part of another embodied form of Embodiment 3 of the image display apparatus according to the present invention.

It is also possible to effect excellent correction for aberration and achieve display of an image with much higher quality of image by using a correcting lens 10 consisting of surfaces S102, S103 including a rotationally asymmetric surface in part of the optical path, as illustrated in FIG. 15.

Figure 16:
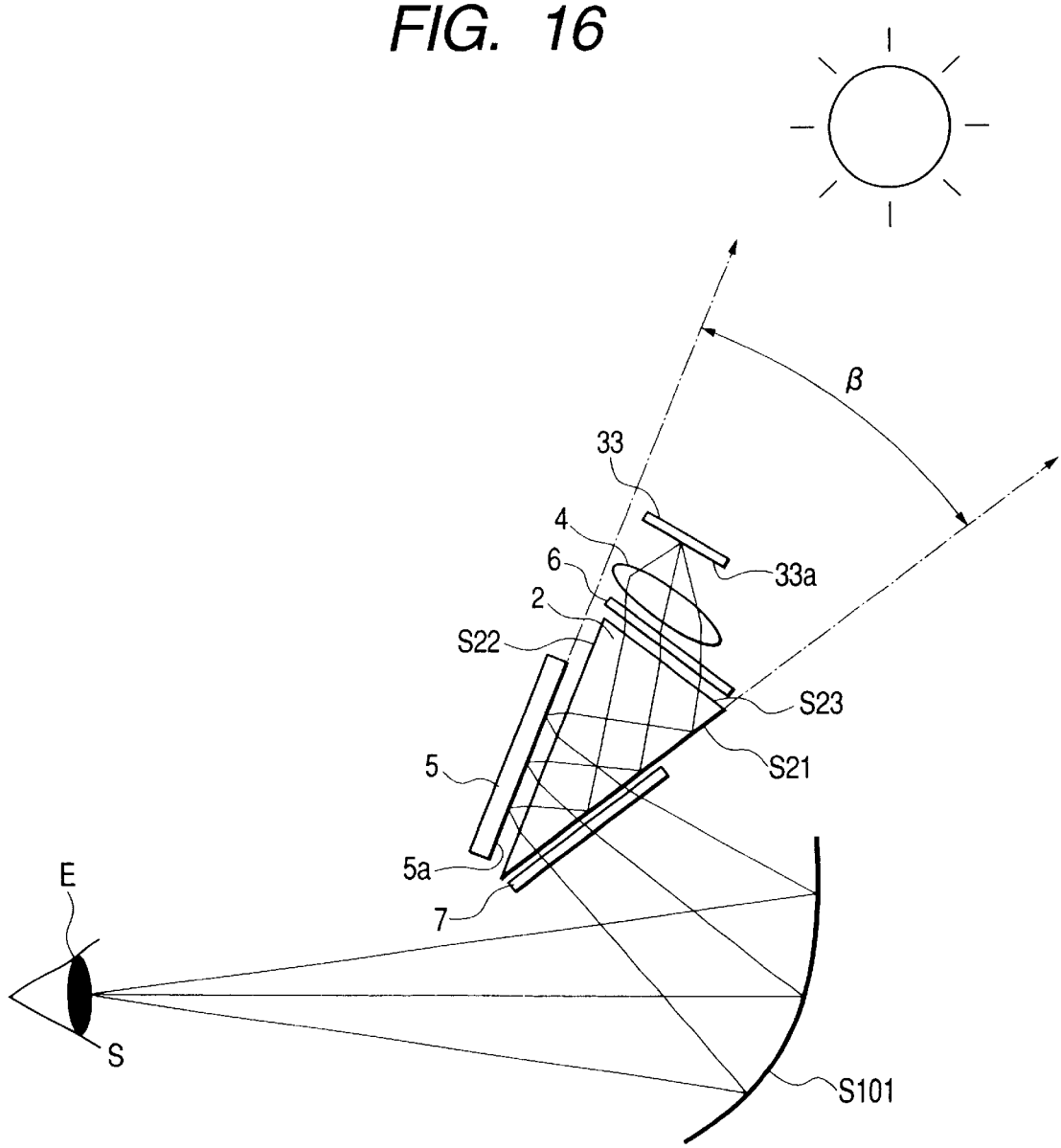
FIG. 16 is a schematic diagram to show the main part of another embodied form of Embodiment 3 of the image display apparatus according to the present invention.

The use of the light source inside the apparatus is not always essential in the image display apparatus of the present invention, and, for example, the ambient light can also be used as a light source as illustrated in FIG. 16.

[Numerical Example]

Figure 9:
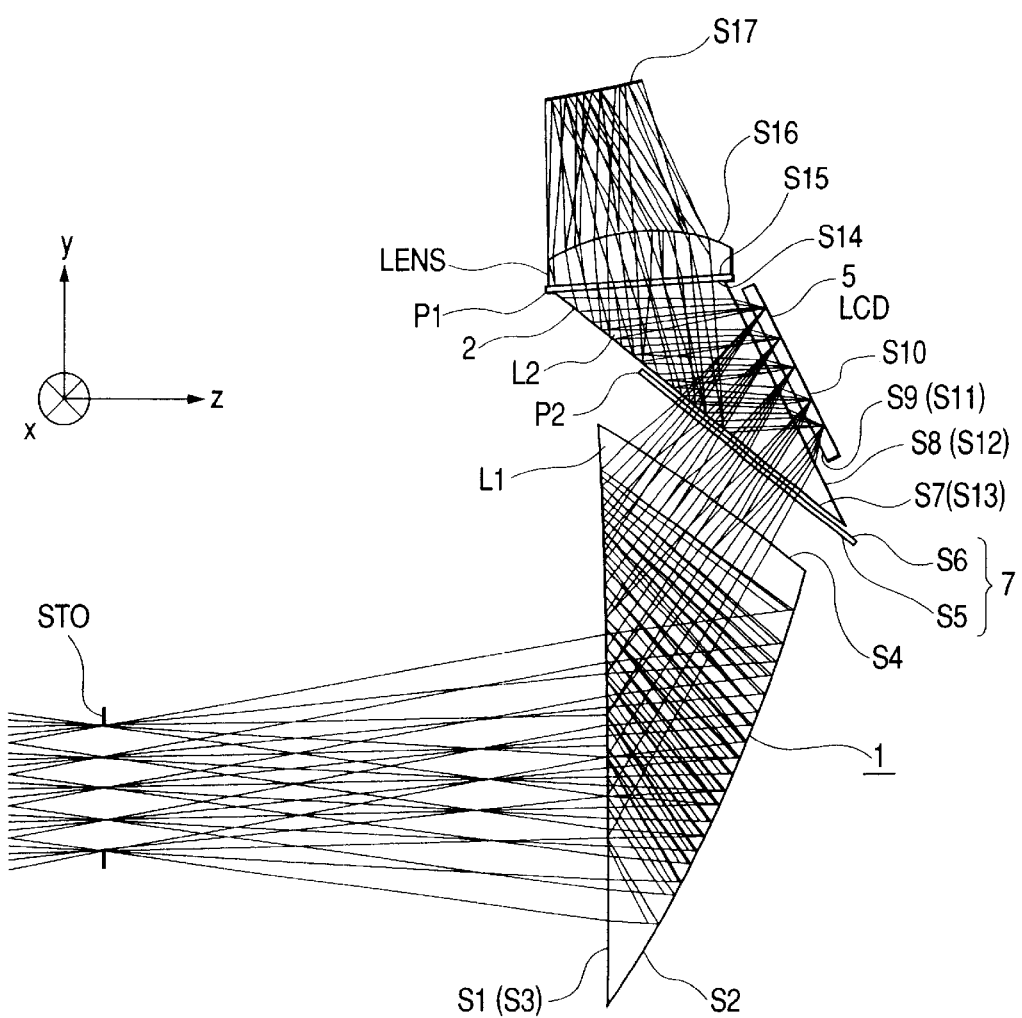
FIG. 9 is a schematic diagram to show the main part of the optical system in a numerical example of the present invention.
Figure 10:
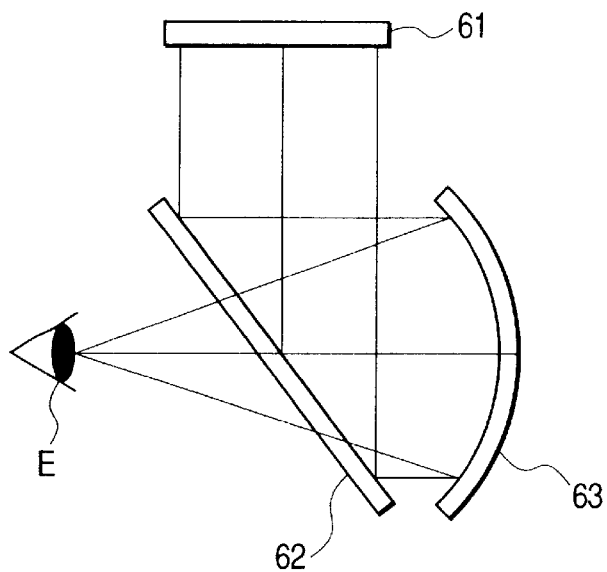
FIG. 10 is a diagram to show the structure of the conventional image display device.
Figure 11:
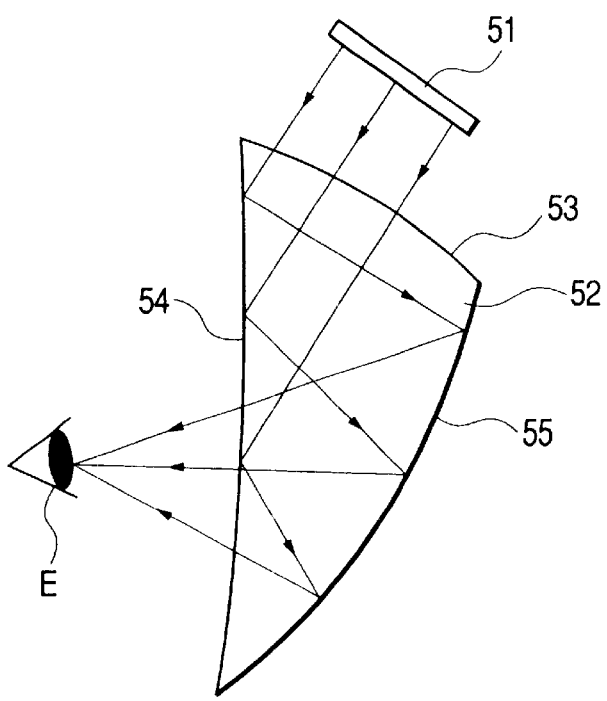
FIG. 11 is a diagram to show the structure of the conventional image display device.
Figure 12:
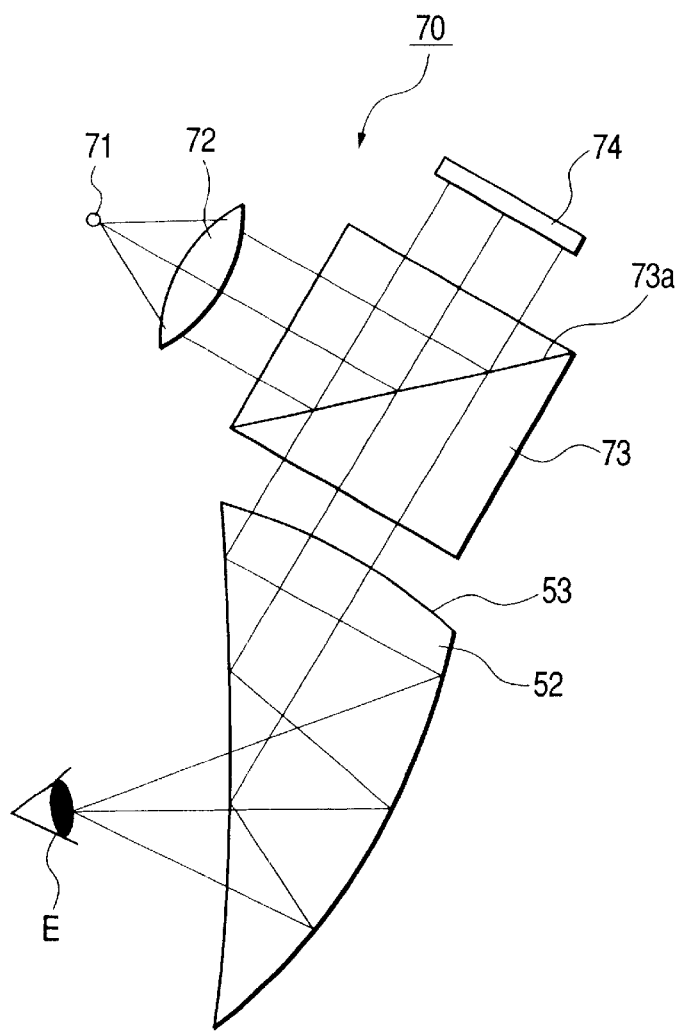
FIG. 12 is a diagram to show the structure of the conventional image display device.

FIG. 9 is a diagram to show a numerical example of the optical systems in the image display apparatus of the present invention. In the figure the origin (0, 0, 0) is set at the center of the exit pupil STO formed by the display optical system (2, 7, 1), the y- and z-axes are taken as illustrated, and the positive direction of the x-axis is taken along the direction going normally into the plane of the drawing. The data of the display optical system is presented in Table 1. In the table, SURF indicates a surface number, and xsc, ysc, and zsc coordinate values in the above coordinate system for the vertex of a surface of interest. Further, asc represents an amount of rotation about the x-axis on the plane of the drawing with the positive direction counterclockwise (units: °). RDY, Nd, and Vd indicate the radius of curvature, the index of refraction (for the d-line), and the Abbe's number, respectively.

The aspherical shapes in the present example are expressed by use of the following equation.

$$z = (1/RDY)*(x^{\wedge}2 + y^{\wedge}2)/(1 + (1 - (1 + c1)*(1/RDY)^{\wedge}2 *$$

$$(x^{\wedge}2 + y^{\wedge}2))^{\wedge}(1/2)) + c2 + c4*y + c5*(x^{\wedge}2 - y^{\wedge}2) + c6*$$

$$(-1 + 2*x^{\wedge}2 + 2*y^{\wedge}2) + c10*(-2*y + 3*x^{\wedge}2*y + 3*$$

$$y^{\wedge}3) + c11*(3*x^{\wedge}2*y - y^{\wedge}3) + c12*(x^{\wedge}4 - 6*x^{\wedge}2*y^{\wedge}2 +$$

$$y^{\wedge}4) + c13*(-3*x^{\wedge}2 + 4*x^{\wedge}4 + 3*y^{\wedge}2 - 4*y^{\wedge}4) + c14*$$

-continued $$(1 - 6*x^{\wedge}2 + 6*x^{\wedge}4 - 6*y^{\wedge}2 + 12*x^{\wedge}2*y^{\wedge}2 + 6*y^{\wedge}4) +$$

$$c20*(3*y - 12*x^{\wedge}2*y + 10*x^{\wedge}4*y - 12*y^{\wedge}3 + 20*x^{\wedge}2*$$

$$y^{\wedge}3 + 10*y^{\wedge}5) + c21*(-12*x^{\wedge}2*y + 15*x^{\wedge}4*y + 4*$$

$$y^{\wedge}3 + 10*x^{\wedge}2*y^{\wedge}3 - 5*y^{\wedge}5) + c22*(5*x^{\wedge}4*y - 10*$$

$$x^{\wedge}2*y^{\wedge}3 + y^{\wedge}5) + c23*(x^{\wedge}6 - 15*x^{\wedge}4*y^{\wedge}2 + 15*x^{\wedge}2*$$

$$y^{\wedge}4 - y^{\wedge}6) + c24*(-5*x^{\wedge}4 + 6*x^{\wedge}6 + 30*x^{\wedge}2*y^{\wedge}2 - 30*$$

$$x^{\wedge}4*y^{\wedge}2 - 5*y^{\wedge}4 - 30*x^{\wedge}2*y^{\wedge}4 + 6*y^{\wedge}6) + c25*(6*$$

$$x^{\wedge}2 - 20*x^{\wedge}4 + 15*x^{\wedge}6 - 6*y^{\wedge}2 + 15*x^{\wedge}4*y^{\wedge}2 + 20*$$

$$y^{\wedge}4 - 15*x^{\wedge}2*y^{\wedge}4 - 15*y^{\wedge}6) + c26*(-1 + 12*x^{\wedge}2 - 30*$$

$$x^{\wedge}4 + 20*x^{\wedge}6 + 12*y^{\wedge}2 - 60*x^{\wedge}2*y^{\wedge}2 + 60*x^{\wedge}4*y^{\wedge}2 -$$

$$30*y^{\wedge}4 + 60*x^{\wedge}2*y^{\wedge}4 + 20*y^{\wedge}6)$$

The optical action will be described below.

The light going out of S17 being the light-emitting surface of the light source means 3 is condensed by a refracting surface S16 to go through a surface S15 into the polarizer P1. After that, the light travels through a surface S14 into the prism L2 and then is totally reflected by a surface S13 (the same surface as S7). Then the light travels through a surface S12 (the same surface as S8) out of the prism L2 to travel toward the LCD 5. The light transmitted by a front surface S11 of a cover glass (the same surface as S9) and reflected by a liquid crystal surface S10 travels through the front surface S9 of the cover glass to be again incident through the surface S8 into the prism L2. The light is refracted and transmitted this time by the surface S7 to go out of the prism. Then the light is subjected to the analyser operation through front and back surfaces S6, S5 of the polarizer P2. The light is then incident through a surface S4 into the prism L1. After that, the light is totally reflected by the same surface as the surface S3 (S1), is reflected by a surface S2, and thereafter is transmitted by a surface S1 to be guided to the pupil STO.

The angles θx, θy of the principal rays of the respective view angles at the total reflection on the surface S13 at this time are presented in Table 2.

In this example the light of the wavelength 525 nm is the principal wavelength.

As apparent from the Table, $|\theta x| \leq 5°$.

The angle θy also satisfies the relation of $\arcsin(1/n) \leq \theta y \leq 1.5 * \arcsin(1/n)$;

that is, $41.1° \leq \theta y \leq 61.7°$.

By setting the angles θx, θy as described above, the image display apparatus is accomplished so as to permit the observation with little degradation of contrast, with little nonuniformity of contrast or the like in the screen, and with excellent quality of image.

TABLE 1

| SURF | XSC | YSC | ZSC | ASC | RDY | Nd | Vd |
|---|---|---|---|---|---|---|---|
| STO | 0.00000 | 0.00000 | 0.00000 | 0.0000 | 0.0000 | 1.000 | |
| 1 | 0.00000 | −22.41937 | 23.70042 | −6.0579 | −310.1617 | 1 571 | 33.8 |
| UDS: | | | | | | | |
| C1: 5.5264E+01 | C5: 2.0340E−03 | C6: −1.7296E−03 | | | | | |
| C10: 2.2378E−05 | C11: −1.2506E−04 | C12: −3.9837E−07 | | | | | |
| C13: −4.0233E−08 | C14: 1.2300E−07 | C20: −4.8171E−09 | | | | | |
| C21: 5.0172E−09 | C22: −4.1389E−09 | C23: −3.0223E−10 | | | | | |
| C24: −3.7561E−11 | C25: −1.2992E−11 | C26: 2.5642E−11 | | | | | |
| 2 | 0.00000 | −12.61503 | 22.91736 | −36.7652 | −67.4317 | 1.571 | 33.8(REFL) |
| UDS: | | | | | | | |
| C1: 3.1045E+00 | C5: −4 8316E−03 | C6: −5.6053E−04 | | | | | |
| C10: −4.7333E−05 | C11: −2.0408E−05 | C12: −2.2218E−06 | | | | | |
| C13: −2.5478E−07 | C14: 5.5077E−07 | C20: −1.7068E−08 | | | | | |
| C21: −8.6003E−09 | C22: 4.6464E−08 | C23: 5.7164E−10 | | | | | |
| C24: 6.2829E−11 | C25: 3.4779E−11 | C26: 1.8032E−10 | | | | | |
| 3 | 0.00000 | −22.41937 | 23.70042 | −6.0579 | −310.1617 | 1.571 | 33.8(TIR) |
| UDS: | | | | | | | |
| C1: 5.5264E+01 | C5: 2.0340E−03 | C6: −1.7296E−03 | | | | | |
| C10: 2.2378E−05 | C11: −1.2506E−04 | C12: −3.9837E−07 | | | | | |
| C13: −4.0233E−08 | C14: 1.2300E−07 | C20: −4.8171E−09 | | | | | |
| C21: 5.0172E−09 | C22: −4.1389E−09 | C23: −3.0223E−10 | | | | | |
| C24: −3.7561E−11 | C25: −1.2992E−11 | C26: 2.5642E−11 | | | | | |
| 4 | 0.00000 | 11.17266 | 32.52023 | 52.0482 | INFINITY | 1.000 | |
| UDS: | | | | | | | |
| C5: 1.4178E−02 | C6: −3.0138E−03 | C10: 4.0294E−04 | | | | | |
| C11: −7.6975E−04 | C12: 5 9919E−05 | C13: −6.2114E−05 | | | | | |
| C14: 2 9183E−05 | C20: −5.3231E−06 | C21: 6.4740E−06 | | | | | |
| C22: −5.2869E−06 | C23: −1.4933E−07 | C24: 7.7861E−08 | | | | | |
| C25: −1.5598E−07 | C26: 3.7223E−08 | | | | | | |
| 5 | 0.00000 | 12.62811 | 34.63620 | 50.9048 | INFINITY | 1.490 | 40.0 |
| 6 | 0.00000 | 12.78333 | 34.76232 | 50.9048 | INFINITY | 1.000 | |
| 7 | 0.00000 | 12.93855 | 34.88844 | 50.9048 | INFINITY | 1.517 | 41.8 |
| 8 | 0.00000 | 13.58149 | 35.41085 | 25.4572 | INFINITY | 0.0000 | |
| 9 | 0.00000 | 13 85089 | 35.99774 | 25.4572 | INFINITY | 1.574 | 55.0 |
| 10 | 0.00000 | 14.15103 | 36.60721 | 25.4572 | INFINITY | 1.574 | 55.0(REFL) |
| 11 | 0.00000 | 13.86089 | 35.99774 | 25.4572 | INFINITY | 1.000 | |
| 12 | 0.00000 | 13.58149 | 35.41085 | 25.4572 | INFINITY | 1 517 | 41.8 |
| 13 | 0.00000 | 12.93855 | 34.88844 | 50.9048 | INFINITY | 1.517 | 41.8(TIR) |
| 14 | 0.00000 | 23.67972 | 26.42647 | 93.6987 | INFINITY | 1.490 | 40.0 |
| 15 | 0.00000 | 23.87930 | 26.41357 | 93.6987 | INFINITY | 1.697 | 36 0 |
| 16 | 0.00000 | 26.27430 | 26.25875 | 93.6987 | −10.0000 | 1.000 | |
| 17 | 0.00000 | 33.45931 | 25.79428 | 99.6987 | 0.0000 | | |

TABLE 2

| field-x | field-y | θ x | θ y |
|---|---|---|---|
| 0.000 | 0.000 | 0.00 | 48.8 |
| 0.000 | 9.058 | 0.00 | 47.4 |
| 0.000 | −9.058 | 0.00 | 52.1 |
| 12.000 | 0.000 | 2.00 | 48.8 |
| 12.000 | 9.058 | 1.35 | 47.7 |
| 6.067 | 9.058 | 0.74 | 47.5 |
| 12.000 | −9.058 | 2.19 | 51.9 |
| 6.067 | −9.058 | 0.86 | 52.4 |
| 12.000 | 4.557 | 1.76 | 48.3 |
| 0.000 | 4.557 | 0.00 | 48.1 |
| 12.000 | −4.557 | 2.11 | 50.0 |
| 0.000 | −4.557 | 0.00 | 50.0 |
| 6.067 | 0.000 | 0.94 | 48.8 |
| 6.067 | 4.557 | 0.89 | 48.1 |
| 6.067 | −4.557 | 0.91 | 49.9 |

As described above, the structure according to the present invention permits the attainment of the image display apparatus enabling the observation of the image displayed on the reflective display means in a wide observation field, with little degradation of contrast, with little nonuniformity of contrast or the like in the screen, and with excellent quality of image while being constructed in the compact size of the entire apparatus by properly setting the angles of incidence of the illumination light to the reflective surface in the illumination optical system.

What is claimed is:

1. An image display apparatus for permitting an observer to observe image information displayed on display means, comprising:

reflective display means;

light source means;

an illumination optical system having a reflective surface (A) for guiding light from the light source means to the display means; and a display optical system for guiding light from the display means to an observation position of the observer, wherein when principal rays are defined as rays emerging from a display surface of the display means and impinging upon the center of an exit pupil and when a center-view-angle principal ray is defined as a ray emerging from the center of the display surface of the display means and passing the center of the exit pupil of the display optical system, the display optical system comprises at least one decentered reflective surface decentered relative to the center-view-angle principal ray and having a power, wherein when illumination principal rays are defined as rays emerging from the light source means and guided onto the display surface by the illumination optical system to become the principal rays, each illumination principal ray illuminates the display surface obliquely, and wherein when a center illumination principal ray is defined as a ray emerging from the light source means and guided to the center of the display surface by the illumination optical system to become the center-view-angle principal ray, when a coordinate system is so defined that a yz plane is set on a surface formed by incidence and emergence of the center illumination principal ray to and from the reflective surface (A) and that a z-axis is taken along a direction of a normal to the reflective surface (A) in the yz plane, a y-axis along a tangent direction thereto, and an x-axis along a direction normal to the yz plane, and when the illumination principal rays are projected onto the xz plane of the coordinate system, the illumination principal rays projected onto the xz plane are incident at respective angles of incidence approximately equal to each other to the reflective surface (A).

2. The image display apparatus according to claim 1, wherein said reflective surface (A) acts to totally reflect the light when the light from said light source means is guided to said display means and said reflective surface (A) acts to transmit the light when the light from the display means is guided to the observation position.

3. The image display apparatus according to claim 1 or 2, wherein in said coordinate system, when said illumination principal rays are projected onto the yz plane, the illumination principal rays projected onto the yz plane are incident at respective angles of incidence approximately equal to each other to said reflective surface (A).

4. The image display apparatus according to claim 2, wherein an optical member having said reflective surface (A) comprises at least one curved surface.

5. The image display apparatus according to claim 1, wherein said reflective surface (A) is a surface having no power at least in the direction of the x-axis.

6. The image display apparatus according to claim 1, wherein said illumination optical system comprises a first polarizer for converting the light from said light source means into linearly polarized light.

7. The image display apparatus according to claim 6, wherein said display optical system comprises a second polarizer whose transmission axis is approximately perpendicular to that of said first polarizer.

8. The image display apparatus according to claim 6, wherein said illumination optical system comprises an optical element having a positive power and light transmitted by the optical element is made incident to said first polarizer.

9. The image display apparatus according to claim 8, wherein said optical element having the positive power comprises a reflective surface.

10. An image display apparatus for permitting an observer to observe image information displayed on display means, comprising:

reflective display means;

light source means;

an illumination optical system having a reflective surface (A) for guiding light from the light source means to the display means; and a display optical system for guiding light from the display means to an observation position of the observer, wherein when principal rays are defined as rays emerging from a display surface of the display means and impinging upon the center of an exit pupil and when a center-view-angle principal rays is defined as a ray emerging from the center of the display surface of the display means and passing the center of the exit pupil of the display optical system, the display optical system comprises a decentered reflective surface or a plurality of decentered optical systems decentered relative to the center-view-angle principal ray and having a power, wherein when illumination principal rays are defined as rays emerging from the light source means and guided onto the display surface by the illumination optical system to become the principal rays and when β represents an angle between the reflective surface (A) and the display surface of the display means, the angle β satisfies the relation of β<45°, and wherein when a center illumination principal ray is defined as a ray emerging from the light source means and guided to the center of the display surface by the illumination optical system to become the center-view-angle principal ray, when a coordinate system is so defined that a yz plane is set on a surface formed by incidence and emergence of the center illumination principal ray to and from the reflective surface (A) and that a z-axis is taken along a direction of a normal to the reflective surface (A) in the yz plane, a y-axis along a tangent direction thereto, and an axis along a direction normal to the yz plane, and when the illumination principal rays are projected onto the xz plane of the coordinate system, the illumination principal rays projected onto the xz plane are incident at respective angles of incidence approximately equal to each to each other to the reflective surface (A).

11. The image display apparatus according to claim 1, 2, or 10, wherein at least one surface out of said plurality of decentered reflective surfaces is a rotationally asymmetric surface.

12. The image display apparatus according to claim 11, wherein said display optical system comprises an optical element integrally formed of said plurality of decentered reflective surfaces, an entrance surface, and an exit surface.

13. An image display apparatus according to claim 12, wherein the reflective surface (A) is located at a side of the entrance surface of said optical element.

14. The image display apparatus according to claim 1,2, or 10, wherein said illumination optical system comprises a plurality of reflective surfaces and said reflective surface (A) is a final reflective surface in an optical path for guiding the light from the light source means to said display means.

15. The image display apparatus according to claim 1,2, or 10, wherein when said illumination principal rays are projected onto the xz plane of said coordinate system and when θx represents an angle between a normal at a hit point of each illumination principal ray on the reflective surface (A) and a line of a projection of said each illumination principal ray onto the xz plane of said coordinate system, each illumination principal ray is incident to said reflective surface (A) so as to satisfy the following condition:

$|θx|<5°$.

16. The image display apparatus according to claim 15, wherein when the illumination principal rays are projected onto the yz plane of said coordinate system, when θy represents an angle between a normal at a hit point of each illumination principal ray on the reflective surface (A) and a line of a projection of said each illumination principal ray onto the yz plane of said coordinate system, and when n represents a refractive index of a medium before and after reflection on the reflective surface (A), each illumination principal ray is incident to said reflective surface (A) so as to satisfy the following condition:

$\arcsin(1/n) < \theta y < 1.5 * \arcsin(1/n)$.

17. An image display apparatus for permitting an observer to observe the image information displayed on display means, comprising:

reflective display means;

light source means;

an illumination optical system having a reflective surface (A) for guiding light from the light source means to the display means; and a display optical system for guiding light from the display means to an observation position of the observer, wherein when principal rays are defined as rays emerging from a display surface of the display means and impinging upon the center of an exit pupil, when a center-view-angle principal ray is defined as a ray emerging from the center of the display surface of the display means and passing the center of the exit pupil of the display optical system, when illumination principal rays are defined as rays emerging from the light source means and guided onto the display surface by the illumination optical system to become the principal rays, each illumination principal ray illuminates the display surface obliquely, and wherein when a center illumination principal ray is defined as a ray emerging from the light source means and guided to the center of the display surface by the illumination optical system to become the center-view-angle principal ray, when a coordinate system is so defined that a yz plane is set on a surface formed by incidence and emergence of the center illumination principal ray to and from the reflective surface (A) and that a z-axis is taken along a direction of a normal to the reflective surface (A) in the yz plane, a y-axis along a tangent direction thereto, and an x-axis along a direction normal to the yz plane, and when the illumination principal rays are projected onto the xz plane of the coordinate system, the illumination principal rays projected onto the xz plane are incident at respective angles of incidence approximately equal to each other to the reflective surface (A).

18. The image display apparatus according to claim 17, wherein said reflective surface (A) acts to totally reflect the light when the light from said light source means is guided to said display means and said reflective surface (A) acts to transmit the light when the light from the display means is guided to the observation position.

19. The image display apparatus according to claim 17 or 18, wherein when the illumination principal rays are projected onto the yz plane of the coordinate system and when $\theta x$ represents an angle between a normal at a hit point of each illumination principal ray on the reflective surface (A) and a line of a projection of the each illumination principal ray onto the xz plane of the coordinate system, each illumination principal ray is incident to the reflective surface (A) so as to satisfy the following condition:

$|\theta x| < 5°$.

20. The image display apparatus according to claim 19, wherein when the illumination principal rays are projected onto the yz plane of the coordinate system, when $\theta y$ represents an angle between a normal at a hit point of each illumination principal ray on the reflective surface (A) and a line of a projection of the each illumination principal ray onto the yz plane of the coordinate system, and when n represents a refractive index of a medium before and after reflection on the reflective surface (A), each illumination principal ray is incident to the reflective surface (A) so as to satisfy the following condition $\arcsin(1/n) < \theta y < 1.5 * \arcsin(1/n)$.

21. The image display apparatus according to claim 17 or 18, wherein when the illumination principal rays are projected onto the yz plane of the coordinate system, when $\theta y$ represents an angle between a normal at a hit point of each illumination principal ray on the reflective surface (A) and a line of a projection of the each illumination principal ray onto the xz plane of the coordinate system, and when n represents a refactive index of a medium before and after reflection on the reflective surface (A), each illumination principal ray is incident to the reflective surface (A) so as to satisfy the following condition:

$\arcsin(1/n) < \theta y < 1.5 * \arcsin(1/n)$.

22. An image display apparatus according to any one of claims 1, 10 and 17, wherein said illumination optical system has a plurality of reflective surfaces, and the reflective surface (A) is a final reflective surface in an optical guide path for guiding the light from said light source means to said display means, acts to totally reflect the light from said light source means, and acts to transmit the light when the light from said display means is guided to a side of said observation position.

23. An image display apparatus according to any one of claims 1, 10 and 17 wherein the reflective surface (A) is only one reflective surface in an optical path for guiding the light from said light source means to said display means.

24. An image display apparatus according to claim 23, wherein the reflective surface (A) acts to totally reflect the light from said light source means, and acts to transmit the light when the light from said display means is guided to a side of said observation position.

25. An image display apparatus comprising:

reflective display means;

an illumination optical system having a reflective surface (A); and a display optical system for guiding light from the display means to an observation position, said apparatus comprising means whereby when a yz plane is defined as a plane formed by incidence and emergence of a center illumination principal ray to and from the reflective surface (A), said center illumination principal ray being defined as a ray guided to the center of a display surface of the display means by the illumination optical system and emerging from the center of the display surface of the display means to pass the center of the exit pupil of the display optical system, and when a coordinate system is so set that a z-axis is taken along a direction of a normal to the reflective surface (A) in the yz plane, a y-axis along a tangent direction thereto, and an x-axis along a direction normal to the yz plane, illumination principal rays guided onto the display surface of the display means by the illumination optical system and emerging from the display surface of the display means to pass the center of the exit pupil of the display optical system illuminate the display surface of said display means obliquely and angles of incidence to the reflective surface (A) on a projection of the respective illumination principal rays onto the xz plane are controlled so as to be approximately constant.

26. An image display apparatus according to claim 10 or 17, wherein said illumination optical system comprises a first polarizer in an optical path for guiding the light from said light source means to said display means and at a side of said light source means with respect to said reflective surface (A).

27. An image display apparatus according to claim 26, wherein said display optical system comprises a second polarizer whose transmission axis is approximately perpendicular to that of said first polarizer, in an optical path for guiding the light from said display means to said observation position.

* * * * *

UNITED STATES PATENT AND TRADEMARK OFFICE
CERTIFICATE OF CORRECTION

PATENT NO.    : 6,493,146 B2
DATED         : December 10, 2002
INVENTOR(S)   : Kazutaka Inoguchi et al.

It is certified that error appears in the above-identified patent and that said Letters Patent is hereby corrected as shown below:

<u>Column 1,</u>
Line 53, "so called a" should read -- a so-called. --.

<u>Column 9,</u>
Line 9, "displace" should read -- display --.

<u>Column 11,</u>
Line 12, "so" should read -- so- --;
Line 15, "so called" should read -- so-called --; and
Line 36, "hot" should read -- not --.

<u>Column 19,</u>
Line 31, "13.85089" should read -- 13.86089 --.

<u>Column 21,</u>
Line 66, "rays" should read -- ray --.

<u>Column 22,</u>
Line 23, "an axis" should read -- an x-axis --;
Line 28, "to each" (second occurrence) should be deleted; and
Line 55, "$|\Theta x|<5°$." should read -- $|\Theta x|\leq 5°$. --.

<u>Column 23,</u>
Line 1, "$\arcsin(1/n)<\Theta y<1.5*\arcsin(1/n)$" should read
-- $\arcsin(1/n)\leq\Theta y\leq 1.5*\arcsin(1/n)$ --; and
Line 57, "$|\Theta x|<5°$." should read -- $|\Theta x|\leq 5°$. --.

UNITED STATES PATENT AND TRADEMARK OFFICE
CERTIFICATE OF CORRECTION

PATENT NO.    : 6,493,146 B2
DATED         : December 10, 2002
INVENTOR(S)   : Kazutaka Inoguchi et al.

It is certified that error appears in the above-identified patent and that said Letters Patent is hereby corrected as shown below:

Column 24,
Lines 4 and 17, "arcsin(1/n)<Θy<1.5* arcsin(1/n)" should read -- arcsin(1/n)≤Θy≤1.5* arcsin(1/n) --; and
Line 28, "17" should read -- 17, --.

Signed and Sealed this

Thirtieth Day of September, 2003

JAMES E. ROGAN
*Director of the United States Patent and Trademark Office*